(12) United States Patent
Miura et al.

(10) Patent No.: US 12,530,441 B2
(45) Date of Patent: Jan. 20, 2026

(54) BIOMETRIC AUTHENTICATION SYSTEM AND AUTHENTICATION METHOD USING A FEATURE PAIR

(71) Applicant: Hitachi, Ltd., Tokyo (JP)

(72) Inventors: Naoto Miura, Tokyo (JP); Keiichiro Nakazaki, Tokyo (JP); Yusuke Matsuda, Tokyo (JP); Yo Nonomura, Tokyo (JP); Akio Nagasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 268 days.

(21) Appl. No.: 18/278,057

(22) PCT Filed: Feb. 18, 2022

(86) PCT No.: PCT/JP2022/006798
§ 371 (c)(1),
(2) Date: Aug. 21, 2023

(87) PCT Pub. No.: WO2022/244357
PCT Pub. Date: Nov. 24, 2022

(65) Prior Publication Data
US 2024/0126853 A1   Apr. 18, 2024

(30) Foreign Application Priority Data

May 18, 2021   (JP) .................................. 2021-084231

(51) Int. Cl.
*G06F 21/00*   (2013.01)
*G06F 21/32*   (2013.01)

(52) U.S. Cl.
CPC .................................. *G06F 21/32* (2013.01)

(58) Field of Classification Search
CPC ...... G06F 21/32; G06V 10/82; G06V 10/993; G06V 10/806; G06V 40/14; G06V 40/171;
(Continued)

(56) References Cited

U.S. PATENT DOCUMENTS

| 12,067,095 B2 * | 8/2024 | Nakazaki ........... G06V 40/1388 |
| 2013/0138964 A1 * | 5/2013 | Joyce, III .............. H04L 9/3231 713/176 |

(Continued)

FOREIGN PATENT DOCUMENTS

| EP | 3 396 589 A1 | 10/2018 |
| JP | 2004-62846 A | 2/2004 |

(Continued)

OTHER PUBLICATIONS

Extended European Search Report received in corresponding European Application No. 22804278.4 dated Mar. 24, 2025.

(Continued)

*Primary Examiner* — William A Corum, Jr.
(74) *Attorney, Agent, or Firm* — MATTINGLY & MALUR, PC

(57) ABSTRACT

High-accuracy multimodal biometric authentication of a plurality of body organisms is achieved while suppressing postural fluctuation when the plurality of body organisms are captured. An authentication system stores feature quantities for body organisms in association with users and performs biometric authentication on the basis of images from a capture device. The capture device photographs a first body organism of a first user during a first period and captures a second body organism and a third body organism of the first user during a second period. The authentication processing device calculates a first feature quantity from the first body part photographed during the first period, respec- (Continued)

tively calculates a second feature quantity and a third feature quantity from the second body organism and the third body organism captured during the second period, and compares with the feature quantities for the body organisms of each user stored at the storage device.

10 Claims, 10 Drawing Sheets

(58) Field of Classification Search
CPC ...... G06V 40/172; G06V 40/67; G06V 40/70; A61B 5/1171
See application file for complete search history.

(56) References Cited

U.S. PATENT DOCUMENTS

| | | |
|---|---|---|
| 2015/0043792 A1 | 2/2015 | Nada et al. |
| 2021/0406567 A1* | 12/2021 | Shibata ............... H04L 63/0861 |
| 2023/0306094 A1* | 9/2023 | Mendlovic ............. G06V 10/84 |

FOREIGN PATENT DOCUMENTS

| | | |
|---|---|---|
| JP | 2009-20735 A | 1/2009 |
| JP | 2014-211838 A | 11/2014 |
| JP | 2020-095063 A | 6/2020 |
| WO | 2020/065851 A1 | 4/2020 |
| WO | 2020/065954 A1 | 4/2020 |
| WO | 2020/208824 A1 | 10/2020 |

OTHER PUBLICATIONS

International Search Report of PCT/JP2022/006798 dated May 17, 2022.

* cited by examiner

BIOMETRIC AUTHENTICATION SYSTEM AND AUTHENTICATION METHOD USING A FEATURE PAIR

TECHNICAL FIELD

This invention relates to an authentication system and an authentication method that authenticates an individual using biometric information.

BACKGROUND ART

In recent years, biometric authentication technology has been used as a means to reduce the risk of information leakage and unauthorized use of mobile terminals such as smartphones and notebook PCs. In particular, mobile terminals used in remote environments are at high risk of unauthorized use by others. Therefore, it is necessary to authenticate the user each time the terminal or information system is accessed. However, it is troublesome to enter the password each time. In addition, there is a risk of forgetting or leaking the password, so biometric authentication, which is simple and reliable, is being introduced in an increasing number of cases.

In addition, cashless payment is becoming increasingly popular at retailers such as convenience stores and restaurants. Cashless payment is highly convenient because it eliminates the hassle of paying cash on the spot, and it can also be used in conjunction with various point services to encourage customer purchases. Biometric authentication can be used for such cashless payment, eliminating the need to carry a card, and providing a convenient and effective service since the identity of the customer can be confirmed without fail.

Thus, although biometric authentication is highly beneficial for controlling unauthorized access and realizing cashless payments, the additional need for a dedicated biometric authentication device increases the cost of introduction, hindering its widespread use.

Therefore, if biometric authentication can be performed using images of the organism captured by general-purpose cameras installed in smartphones and notebook PCs, the barrier to introducing biometric authentication can be lowered. Furthermore, if authentication can be performed without contact, the risk of spreading infectious diseases, a recent social problem, can be reduced, and the system can be introduced and used with peace of mind.

In biometric identity authentication, the user's finger, hand, face, or other organism part is held over the authentication terminal, and the user's identity is verified by comparing the biometric information with the pre-registered biometric information. Only when the user is authenticated as a registrant can he/she login or make a payment. Among various biometric authentication technologies, biometric authentication based on internal features of the organism, such as finger veins, is known to provide highly accurate authentication. Finger vein authentication uses complex blood vessel patterns inside the finger to achieve superior authentication accuracy and is more difficult to counterfeit or tamper with than fingerprint authentication, thereby providing a high level of security.

Biometric authentication using a general-purpose camera is more difficult than biometric authentication using a dedicated sensor that specializes in capturing images of the organism under optimal conditions, and the quality of the images tends to degrade the accuracy of the authentication process. To compensate for this degradation in accuracy, multimodal biometric authentication technology, which improves authentication accuracy by using multiple biometric data, is effective. Basically, it is possible to effectively improve authentication accuracy by combining multiple biometric features that are relatively easy to capture at the same time, each of which has a low correlation with each other or with the shooting conditions, and each of which plays a complementary role to the other.

As one type of multimodal biometric authentication using a general-purpose camera, a method has been proposed in which biometric data of the face and fingers are held up to a front camera. Conventional methods include capturing the finger after capturing the face, or simultaneously capturing the face and finger at separate locations.

The former tends to take a long time to capture images, while the latter is difficult to operate when holding a living organism over the screen at the same time. In the latter case, the face may be tilted by looking into the screen to hold a finger in a certain position, or the face may be shielded by the held-up finger.

Thus, in order to achieve multimodal biometric authentication by simultaneously holding up multiple organisms, the challenge is to provide authentication technology that is less susceptible to fluctuations in the posture of the organisms and shielding.

In addition, since multiple organisms are used, the calculation time tends to be long, and it is desirable to be able to perform the authentication process as quickly as possible.

There is Patent Document 1 as a multimodal authentication technology that simultaneously performs face and fingerprint matching. There is also Patent Document 2 as a technology that measures the flatness of the face image while using face and fingerprints for authentication.

CITATION LIST

Patent Document

Patent Document 1: JP2009-20735A
Patent Document 2: JP2004-62846A

SUMMARY OF THE INVENTION

Problems to be Solved by the Invention

In multimodal biometric authentication, where multiple biometric features are presented simultaneously, it is sometimes difficult to capture biometric features in good condition due to posture variation or shielding, which degrades authentication accuracy. In addition, the need to process multiple biometric features increases the authentication time.

In Patent Document 1, there is a first phase in which face matching is performed using face data, and a second phase in which finger matching and face capturing are performed, with the second phase capturing face images in parallel with the finger matching process. In addition, Patent Document 1 discloses a technique for detecting the face orientation (up, down, left, right) of a face image. However, in Patent Document 1, the face image capture in the second phase is used for gesture judgment, not face recognition, and there is no mention of technology to solve issues related to improving the accuracy and speed of multimodal authentication.

In Patent Document 2, the lighting for photography is turned on toward the face at the timing when the finger is placed on the fingerprint sensor, and the face is captured by a camera. It discloses a technique for personal authentication using the same categories of each feature for face and fingerprint authentication, and using the identification method based on the minimum distance, etc. Although Patent Document 2 discloses the perspective of implementing highly accurate multimodal biometric authentication using face and fingerprints, there is no mention of technology to improve accuracy by suppressing posture variation, in addition to the need for a fingerprint sensor.

The problems described above are not limited to face and finger multimodal biometrics, but also apply to various other biometrics such as iris, auricle, facial veins, subconjunctival vessels, palm veins, dorsal veins, palm print, inner and outer finger joint prints, veins on the back of fingers, and others. Thus, in multimodal biometric authentication using various biometrics, the conventional technology has the problem that the biometrics cannot be observed correctly due to posture fluctuation or shielding, resulting in reduced authentication accuracy.

The purpose of this invention is to provide a biometric authentication system and a biometric authentication method that can achieve highly accurate and fast authentication even when posture variation or shielding occurs during multimodal biometric imaging.

Solutions to Problems

In a preferred example of the biometric authentication system of the present invention, an authentication system including a capture device which captures images of a living organism, a memory device connected to the capture device that stores a plurality of biometric features for each user in correspondence with each other, and an authentication processing device that inputs images captured by the capture device and performs biometric authentication using the input images. The capture device of the authentication system, in a first period of time, captures a first living organism of a first user, and in a second period of time, different from the first period of time, captures a second and a third living organism of the first user. The authentication processing device of the authentication system calculates a first feature from the first organism captured during the first period of time and calculates a second and a third feature values from the second and third organisms captured during the second period, respectively. The authentication processing device authenticates the first user by matching the first, the second, and the third feature values with the feature values of the organism of each user stored in the storage device.

Effects of the Invention

The present invention enables highly accurate authentication even when posture variation or shielding occurs during biometric imaging in multimodal biometrics, in which multiple biometrics are presented simultaneously.

MODE FOR CARRYING OUT THE INVENTION

Figure 1A:
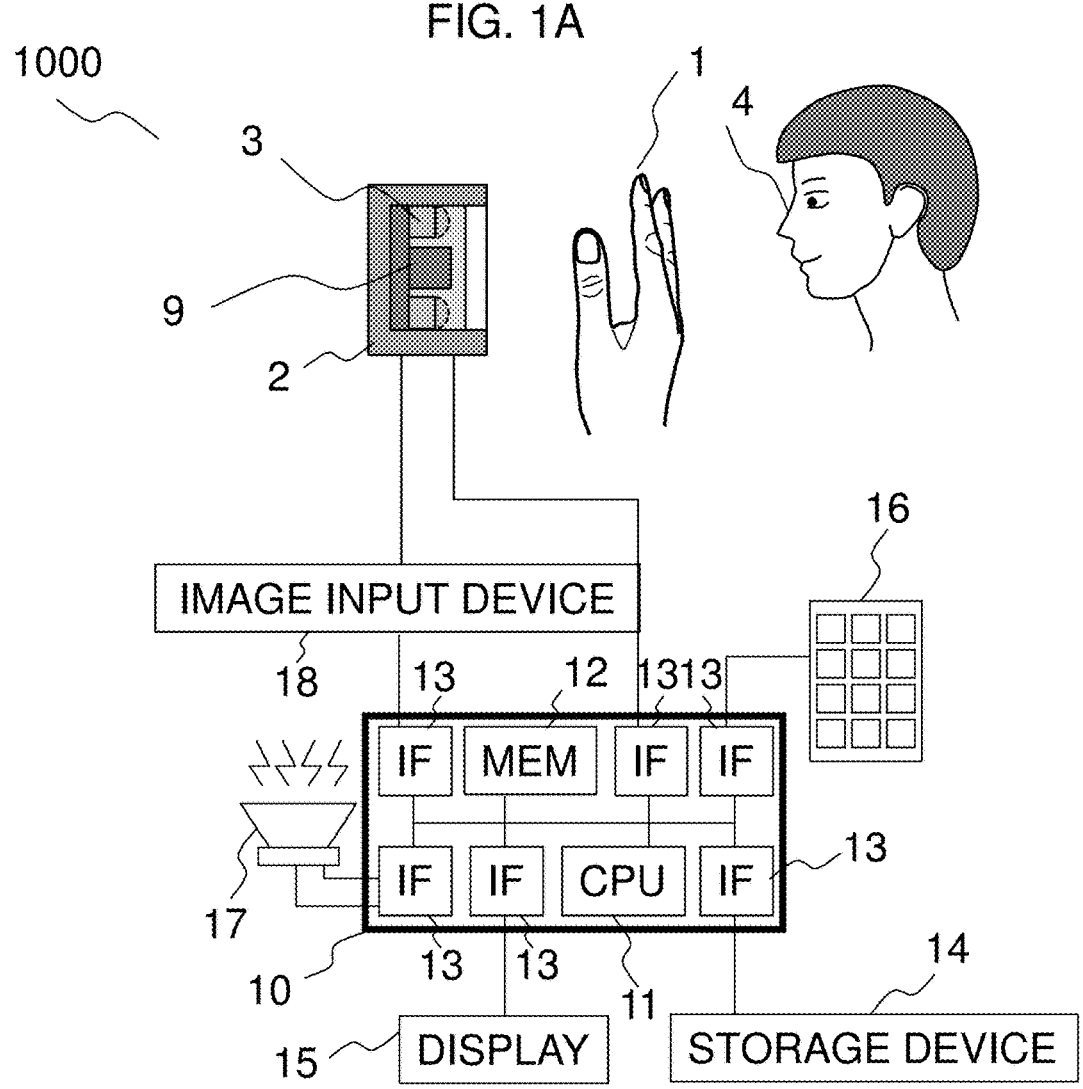
FIG. 1A shows an overall configuration of the biometric authentication system for Embodiment 1.

The following description of embodiments of the invention will be made with reference to the drawings. The following description and drawings are illustrative examples to explain the invention and have been omitted or simplified as appropriate for clarity of explanation. The invention can also be implemented in various other forms. Unless otherwise limited, each component can be singular or plural.

The position, size, shape, extent, etc. of each component shown in the drawings may not represent the actual position, size, shape, extent, etc., to facilitate understanding of the invention. Therefore, the invention is not necessarily limited to the position, size, shape, range, etc. disclosed in the drawings.

In the following description, the process performed by executing the program may be described, but the program is executed by a processor (e.g., CPU (Central Processing Unit), GPU (Graphics Processing Unit)) to perform the defined process, The processor may be the main organism of the processing in order to perform the processing while using memory resources (e.g., memory) and/or Interface devices (e.g., communication ports), etc., as appropriate. Similarly, the subject of the processing performed by executing the program may be a controller, device, system, computer, or node having a processor. The processing entity that executes the program may be an arithmetic unit, and may include a dedicated circuit (e.g., FPGA (Field-Programmable Gate Array) or ASIC (Application Specific Integrated Circuit)) that performs specific processing. The processing entity that executes the program may be an arithmetic unit.

In this document, biometric features are biological information that refers to anatomically distinct features of a living organism, such as finger veins, fingerprints, joint patterns, skin patterns, ring contour shape, fatty lobule pattern, ratio of length of each finger, finger width, finger area, melanin pattern, palm veins, palm print, veins on the back of the hand, facial veins, ear veins, or face, ear, iris, etc.

First Embodiment

FIG. 1A shows an example of the overall configuration of the biometric authentication system 1000 using biometric features in this embodiment. It goes without saying that the configuration in this embodiment can be configured not as an authentication system but as an authentication device with all or part of its components mounted in a chassis. The authentication process may be performed outside the device, and the device may be a finger image acquisition device or finger feature image extraction device that specializes in acquiring finger images. It may also be implemented as a terminal.

At least, an authentication device is a biometric authentication device equipped with an image capturing unit that captures or takes a picture of a living organism and an authentication processing unit that processes the captured image to authenticate the living organism, and a biometric authentication system that is connected to an image capturing unit that takes a picture of a living organism and a biometric authentication system. The system including the authentication device is called a biometric authentication system or biometric authentication system. A biometric authentication system includes a biometric authentication device and a biometric authentication system.

The biometric authentication system 1000 in this embodiment shown in FIG. 1A includes input device 2, which is an imaging unit, authentication processing device 10, storage device 14, display 15, input device 16, speaker 17, and image input unit 18. Input device 2 includes a capture device 9 installed inside the enclosure and a light source 3 installed in the enclosure. The authentication processing device 10 is equipped with an image processing function.

The light source 3 is a light emitting device such as LED (Light Emitting Diode) that irradiates light to face 4 and finger 1, which is a fixed area of the user presented on input device 2. The light source 3 may be capable of irradiating light of various wavelengths depending on the implementation and may also be capable of irradiating transmitted light from the living organism or reflected light from the living organism.

Capture device 9 captures images of finger 1 and face 4 presented to input device 2. The capture device 9 is an optical sensor capable of capturing single or multiple wavelengths of light, and may be a monochrome or color camera. The capture device 9 may be a multispectral camera capable of simultaneously capturing ultraviolet or infrared light in addition to visible light. The capture device 9 may also be a distance camera capable of measuring the distance of a subject, or it may be a stereo camera configuration that combines multiple cameras of the same type.

Input device 2 may include multiple capture devices. Furthermore, finger 1 may be multiple and may include multiple fingers of both hands simultaneously.

The image input unit 18 acquires images captured by the capture device 9 in the input device 2 and outputs the acquired images to the authentication processing device 10, For example, various reader devices (e.g., video capture boards) can be used to read images.

The authentication processing device 10 consists of a computer including, for example, a central processing unit (CPU) 11, memory 12, and various interfaces (IFs) 13. The CPU 11 executes a program stored in memory 12 to realize each functional part, such as authentication processing.

Figure 1B:
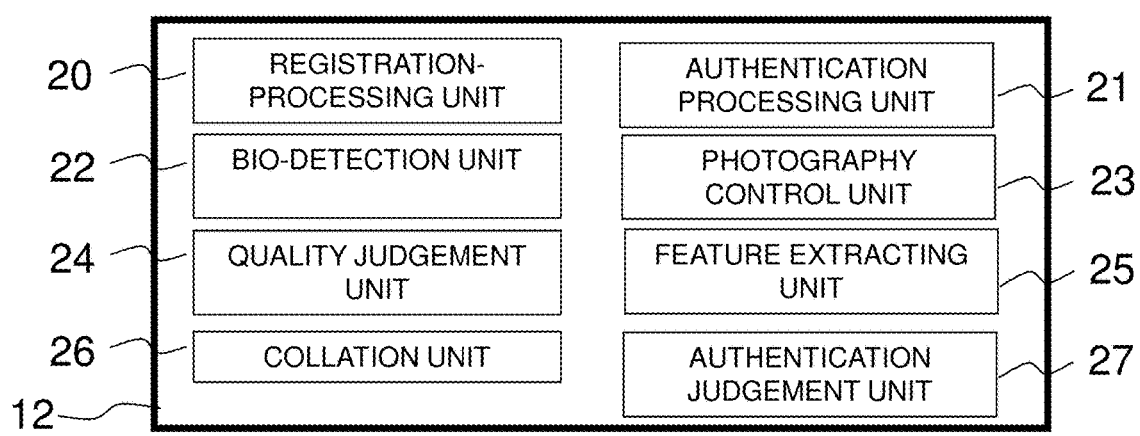
FIG. 1B shows an example of the functional configuration of a program stored in memory for Embodiment 1.

FIG. 1B shows an example of the functional configuration of the program stored in memory 12 to realize each function of the authentication processing device 10.

As shown in FIG. 1B, the authentication processing device consists of a registration-processing unit 20 that registers the biometric features of an individual in advance by linking them to the individual ID, an authentication-processing unit 21 that authenticates the biometric features extracted from the captured image based on the registered biometric features and outputs the authentication result. The bio-detection unit 22 detects the position of the organism and removes unnecessary background from the input image, the photography control unit 23 takes a picture of the presented organism under appropriate conditions, and the authentication processing unit 21 outputs the authentication result based on the registered biometric features extracted from the captured image. Control unit 23 that takes pictures of the presented organism under appropriate conditions. Judgment unit 24 that judges the quality of the images taken of the organism and the posture of the organism. A feature extraction unit 25 that extracts biometric features by appropriately correcting the posture of the organism during the registration and authentication processes, A collation unit 26 compares the similarity of biometric features. And a photofinishing unit 27 performs the image processing. The feature extraction unit 25 compares the similarity of biometric features during the registration and authentication processes. Collation unit 26 compares the similarity of biometric features, and the authentication judgment unit 27 judges the result of authentication based on the matching results of multiple biometric features. Memory 12 stores programs executed by CPU 11. The memory 12 also temporarily stores images and other data input from the image input unit 18.

Interface 13 connects authentication processing device 10 to external devices. Specifically, interface 13 is a device that has ports for connecting input device 2, storage device 14, display 15, input device 16, speaker 17, and image input unit 18.

In addition, interface 13 functions as a communication section and is used by authentication processing device 10 to communicate with external devices via a communication network (not shown). The communication part is a device that communicates in accordance with the IEEE 802.3 standard if the communication network is a wired LAN, or in accordance with the IEEE 802.11 standard if the communication network 30 is a wireless LAN.

Storage device 14 consists of, for example, a hard disk drive (HDD) or solid-state drive (SSD), and stores user registration data and other data. The registration data is information obtained during the registration process and used to match users and is stored by mapping multiple biological features to each user. For example, it is data of images and biometric features such as face features, finger features and finger vein patterns associated with the registrant ID as user identification information.

The finger vein pattern image is an image of finger veins, which are blood vessels distributed under the skin of the finger, captured as a dark shadow pattern or a slightly bluish pattern. The feature data of the finger vein pattern consists of data converted into a binary or 8-bit image of the vein area, or data consisting of the coordinates of feature points such as vein bends, branches, and end points, or feature quantities generated from luminance information around feature points, or data that is encrypted to make it unreadable.

The display 15 is, for example, a liquid crystal display and is an output device that displays information received from the authentication processing device 10 and posture guidance information and posture judgment results of the living organism.

The input device 16 is, for example, a keyboard or touch panel, and transmits information input from the user to the authentication processing device 10. The display 15 may have an input function such as a touch panel. Speaker 17 is an output device that transmits information received from the authentication processing device 10 in the form of an acoustic signal, for example, voice.

Figure 2:
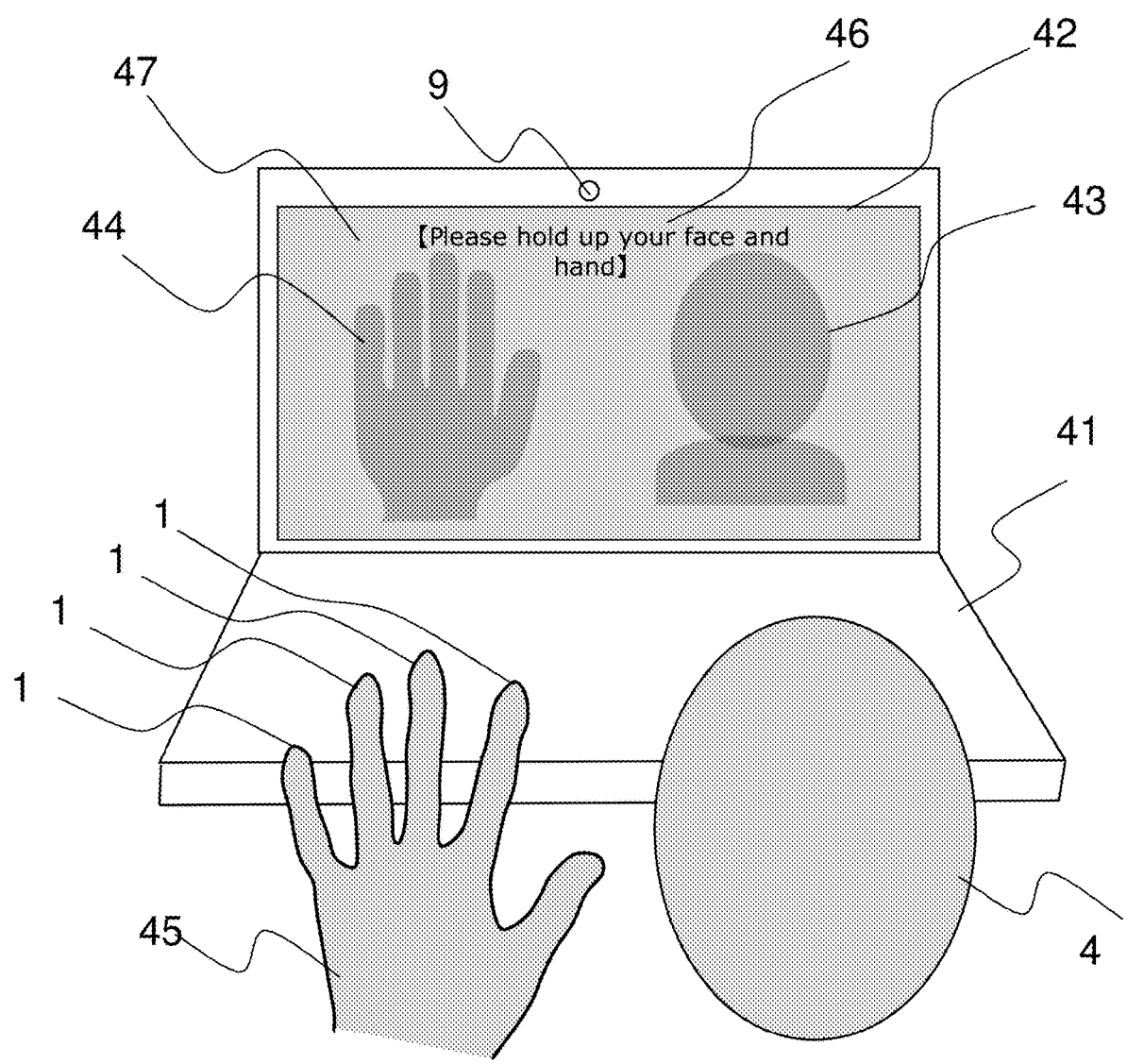
FIG. 2 is a schematic diagram of a multimodal biometric authentication device using a general-purpose front camera.

FIG. 2 shows a schematic diagram of the multimodal biometric authentication device with a generic front camera described in this embodiment. As an example, we will describe a case in which a user logs into a notebook PC and multi-modal biometric authentication is performed using biometric features of the user's face and left hand fingers.

In order to work on the notebook PC, the user activates the authentication function to login to the PC. At this time, the user is often positioned in front of the notebook PC 41, and in a typical notebook PC 41, the camera 9 is installed above the display 42 in order to facilitate capturing the user's face 4. The camera 9 is installed so that the user's face 4 and left hand 45 can be captured as a whole. This means that the user's face 4 is captured near the center of the angle of view of the camera 9 image.

The authentication system activates the camera 9 to capture the user's biometric features, and in order to facilitate the user's understanding of how to hold up the organism, the image captured by the camera 9 is displayed on the display 42, and a preview image 47 that is an image of the face guide 43 and finger guide 44 are overlaid on the display 42. However, the guide display may be omitted in cases where there is no particular need to display a guide, such as when authentication can be performed by holding the organism in an arbitrary position. Displaying the guide as necessary has the effect of facilitating the user's authentication operation and improving convenience.

The user aligns face 4, left hand 45 and finger 1 with the displayed guide position while viewing this preview image 47. When the authentication system detects that a user's organism has been presented, it performs authentication based on multiple biometric features. If it can determine that the user is a pre-registered user, the notebook PC 41 is transitioned to the login state. The specific methods of registration and authentication are described in detail below.

Figure 3:
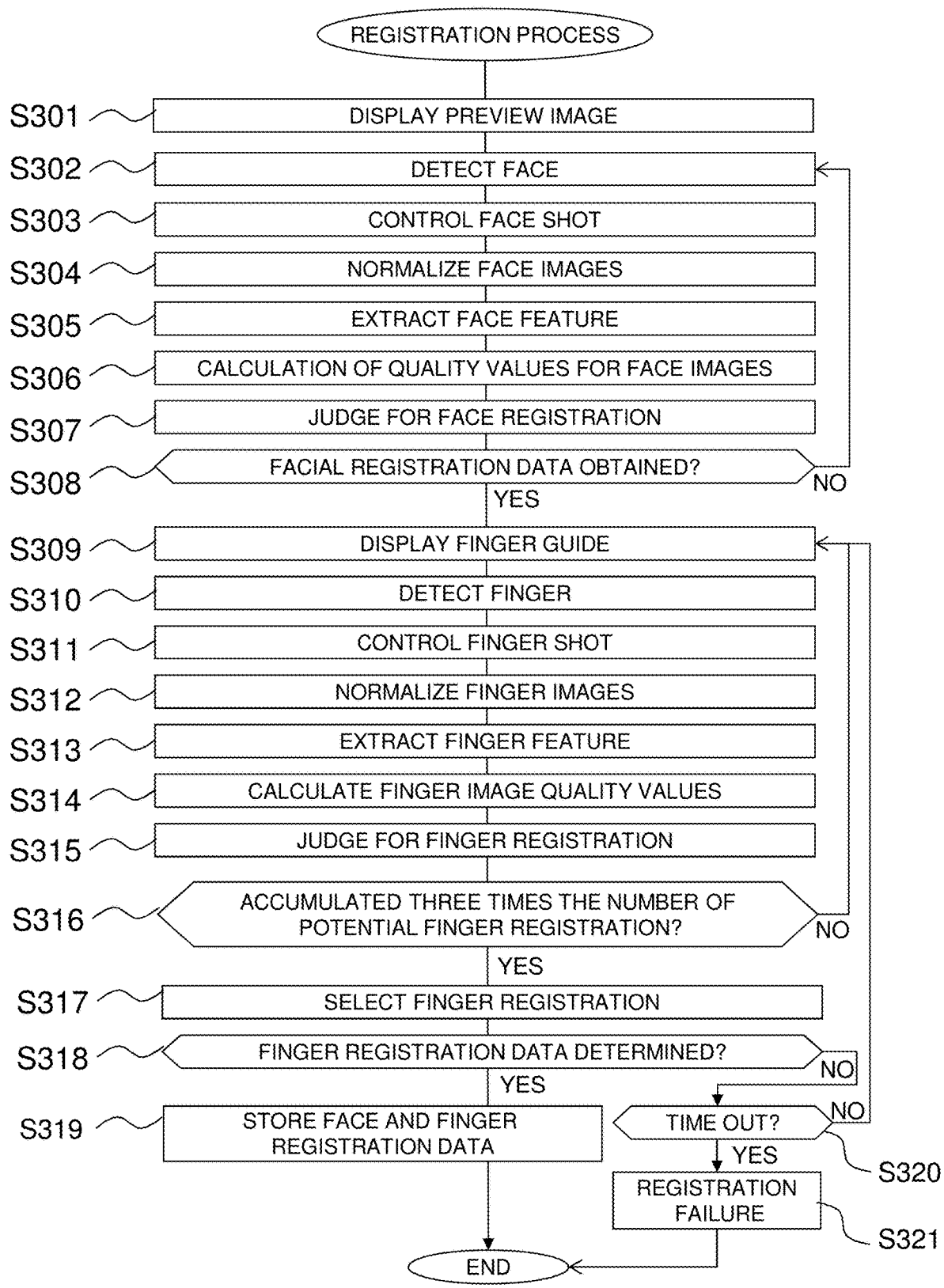
FIG. 3 shows an example of the processing flow of the registration-processing unit of the biometric authentication system.
Figure 4:
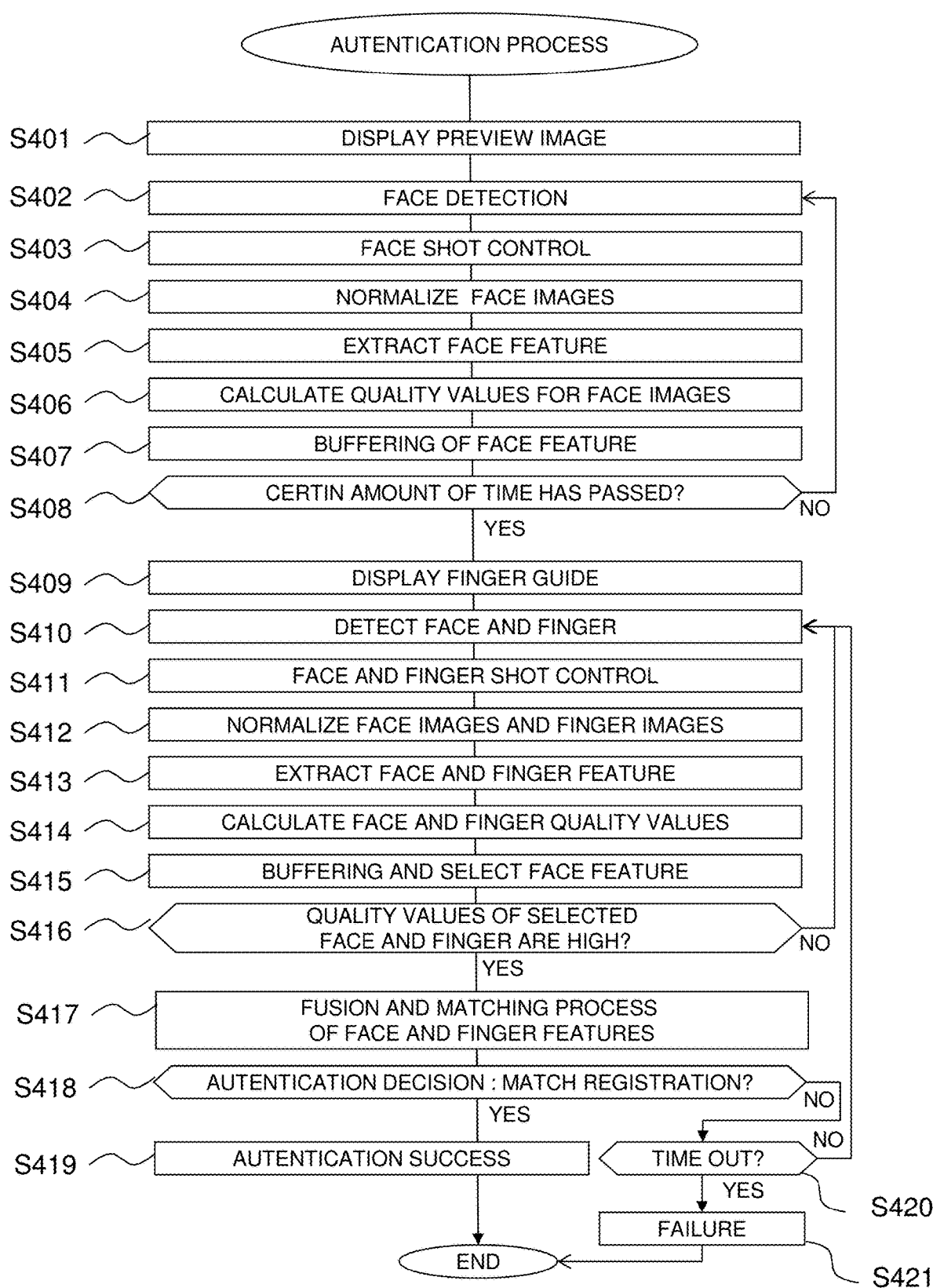
FIG. 4 shows an example of the processing flow of the authentication processing unit of the biometric authentication system.

FIG. 3 and FIG. 4 show an example of the schematic flow of the registration and authentication processes for the multimodal biometric authentication technique using multiple biometric features described in this embodiment, respectively. This registration and authentication process is realized, for example, by a program executed by CPU 11 of the authentication processing device 10 described above. In this embodiment, it is assumed that the user's face and the four fingers of the left hand are captured, but the face may be a partial feature of the face rather than the entire face. For the fingers, it may be a single finger or any other number of fingers. It may also be any number of biometric features of any type, such as iris, veins, fingerprints, palmprints, etc., which are widely known other than face and fingers.

First, the registration process flow is described in FIG. 3.

The registration-processing unit 20 is activated by the user's instruction for the registration process. First, the authentication system displays a preview image on the display explaining to the user that the user is going to register a living organism (S301). The user can grasp the sequence of the registration process through the displayed preview image. The preview image explains the flow of the registration process by showing the user the ideal way to hold up the face and four fingers, the procedure for holding up the face and four fingers, and text such as "First, take a picture of the face, then hold up the four fingers of the left hand." This can reduce errors in the registration process.

The current camera image is displayed on display 15 as a preview image so that you can see yourself being filmed by the camera. The display may be made for the entire screen, or it may be displayed in a small portion of the screen. At this time, if the camera image is displayed inverted so that the left and right sides of the image match the left and right sides of the user, it will be easier for the user to hold up his/her own organism.

Next, the face detection process is performed (S302), which is a pre-processing step for registering face features. As an example, a deep neural network that has learned the relationship between the face image, the position of the face, and the position of facial organs (facial parts or landmarks) is prepared in advance, and the face image is input to this network to obtain a rectangular face region (bounding box) or face ROI image (ROI: Region of Interest) can be obtained by inputting the face image into the network. Facial landmarks consist, for example, of the center of the eyes, the tips of the eye lids and eye corners, the edges of the eyelids (eyelids), the tip of the nose, the left and right corners of the mouth, the center position between the eyebrows, and so on. The rectangle encompassing these can be defined as the face area. In this embodiment, the biometric features related to the face are registered without recognizing that the user is capturing the face as a biometric feature. This is because the user is usually located in front of the PC, such as when logging into a PC as shown in FIG. 2, so the biometric features of the face can be registered without the user being aware of it. However, the frame of the face bounding box may be superimposed over the preview image so that the user is aware that face detection is being performed. In addition, a guide such as "Please turn your face to the front"

may be displayed. Furthermore, a face guide that imitates the outline of a face may be displayed so that the user can visually understand that he/she is currently in the phase of capturing a face and where to hold his/her face.

Next, the photographic control unit 23 is activated to perform face capture control, in which camera parameters such as exposure time, gain, white balance, and focus are appropriately adjusted while capturing the face (S303). Here, the camera exposure time is adjusted to prevent white skipping or blackout inside the detected face ROI image, and the focus is adjusted so that the camera's focus is on the face.

The white balance of the entire image is automatically adjusted based on a method such as the gray hypothesis, which assumes that the average color of the entire image is the color of the ambient lighting. The exposure time can be adjusted by adjusting the exposure time of the camera, or the exposure time can be adjusted softly by weighted integration of the pixel values of multiple consecutive image frames. The soft exposure adjustment method has the advantage that the exposure of the image can be partially corrected, so that, for example, each living organism of a face and multiple fingers can be optimally corrected for exposure independently.

Next, the acquired face ROI images are normalized (S304). One example of normalization is to scale the face so that the size of the face (area of the face ROI, etc.) is constant, to generate a pseudo-frontal face by perspective projection transformation to correct the face orientation so that it faces forward, and to multiply the face brightness by a constant so that it is constant. This normalization is a pre-processing step to stabilize the results of face feature extraction to be performed at a later stage.

Next, face feature extraction is performed (S305). As an example of face feature extraction, a deep neural network that outputs arbitrary fixed-length feature vectors using face ROI images as input is used. Training is performed on this deep neural network so that the L1 distances of feature vectors obtained from multiple face ROI images that are the same face are minimized with respect to each other and the L1 distance to feature vectors obtained from face ROI images that are different faces is maximized. Deep neural networks are used to acquire feature vectors from face ROI images.

According to this method, features acquired from the same face image are converted to have a small L1 distance from each other, while features acquired from another face image are converted to have a large L1 distance. Therefore, whether or not the face images are identical can be evaluated based on the distance (degree of difference) between patterns. Although the L1 distance is described here, any distance space can be used. Generally, distance learning of feature values is used to classify a person from others. Widely known specific methods include the Triplet Loss method and ArcFace, which can achieve distance learning by simply learning a general class classification problem.

Next, the quality value of the face image is calculated (S306). As an example of how to calculate the quality value of a face image, the following items are quantified: face size, brightness of the face area, face orientation, facial expression, face movement speed, and temporal variation of face features extracted from the face image, and the judgment is based on the weighted sum of these items. For example, the size of the face is the size of the face ROI image described above, and if this is small, the quality value is reduced because it can be judged that the face was not captured at a large enough size.

The brightness of the face is determined from the average luminance of the face ROI image before normalization, and if it is darker than expected or too bright, or if there are too many white out pixels, the quality value can be judged as low.

For the face orientation, the three-dimensional rotation angles are estimated for the facial landmarks described above, based on the landmark positions that occur in an average frontal face, and if the weighted sum of the pitching rotation angle, rolling rotation angle, and yawing rotation angle of the face is close to 0, the quality is considered high, and if the value is large, it is considered to be not a frontal face and its quality value is considered to be low.

The ideal facial expression is to have no facial expression, and the quality value is calculated by using general machine learning methods to calculate the degree of smiling, etc., so that the more expressionless the facial expression is, the higher the quality value.

For the speed of face movement, if the movement of the center point of the face ROI in the frame images before and after in time is large, the quality value is judged to be low because the face is not stationary. For temporal variation of face feature values, face feature values are extracted from the face ROI image as described above, and the similarity of the face feature values to the frame images before and after the face ROI image in time is determined by a brute force analysis, and if the variation is large, the quality value of the face image is determined to be low because the extracted feature values are unstable.

Each of these evaluation items is quantified and the values are fused together by weighting, and this is obtained as the final quality value of the face image.

Another method is to use a deep neural network that takes multiple face ROI images arranged in time series as input and any scalar value as output. This deep neural network is trained to output a low scalar value (e.g., 10) when time-series images of face ROIs with a tendency to have large distances between face features of the same face are input, and to output a high value (e.g., 1000) when the distance tends to be small. In this way, a high value can be acquired when a time-series image of a face ROI with a high tendency for successful authentication is input. Since the higher the value obtained in this way, the more suitable it is for authentication, it can be used as a quality value. This method eliminates the need to manually enumerate each evaluation item as described above, thus increasing development efficiency, and has the advantage of making it easy to increase the correlation between quality values and authentication success.

The item to detect blinking may be included among the evaluation items of the face quality value. Before capturing a face image, a guidance message such as "Please blink several times" is displayed and a certain amount of time is allowed for blinking. Otherwise, the quality value is lowered to indicate that the face is a fake face such as a printout. This makes it possible to reject fake face images for which at least a blink cannot be performed as having a low-quality value.

Next, a face registration decision is made (S307). Since the quality value of a face image is a criterion for determining that the image quality and facial posture are suitable for registration or authentication, this quality value can be used to determine the suitability of the currently acquired face features for registration. Therefore, a predetermined threshold value can be set for the quality value of the face image, and if it is exceeded, it can be judged as suitable for registration.

However, if the quality value is accidentally increased, registration of that data may result in unstable authentication. Therefore, it may be determined that face feature values can be registered when they exceed a predetermined threshold value in succession, or when the quality value of the current face image is integrated over time and exceeds a certain value.

In this process, multiple feature values with face quality values exceeding a predetermined threshold are generated. One example of a method for determining the final registration data is to select the feature with the highest quality value, or to register the feature with the lowest total difference when the respective feature values are matched on a round-robin basis. The latter method has the advantage of improving the accuracy of authentication because it selects the feature values that are most stable on average for authentication even when fluctuations occur in the quality of the face image or the posture of the face.

Next, the registration judgment determines whether the registration data for the face has been obtained (S308). If registration data could not be uniquely determined in the previous step of registration judgment, the process starts over again from face detection. If the registration data for a face is determined, it is temporarily stored in memory, etc., and the process moves on to the next step, finger registration. Although not shown in the figure, a timeout period may be set for the registration process, and if no face registration data is obtained after that time has elapsed, the process may end with a transition to registration failure (S321).

Next, finger registration is performed. First, as shown in FIG. 6C, a finger guide is displayed on the screen as an overlay to the preview image, which is the user's camera image (S309). The user holds up his/her left hand to align it with the finger guide while checking the finger guide on the screen and his/her own preview image. At this time, a guide message such as "Please hold your left hand over the finger guide" may be displayed.

Next, the finger detection process is performed (S310). In the finger detection process, the finger and background are first separated, and then a finger ROI image is acquired to cut out the finger on a finger-by-finger basis. As an example of the background separation process, a camera image with a finger held up is input to a deep neural network that outputs a finger mask image in which only the finger region is 1 and the rest are 0. The network is trained to correctly output a finger mask image for any input image, and the finger mask image is acquired and the background is masked (removed).

As one method of acquiring a finger ROI image that crops a finger by finger, the finger can be cropped into a rectangle based on deep learning that can extract finger landmarks such as fingertips, finger bases, and finger joints, similar to the facial landmark detection method described above.

Thereafter, the finger is captured (S311). Here, the process is the same as the face capture process described above, except that the area of the ROI image of the finger is controlled to have appropriate brightness, appropriate white balance, and appropriate focus.

Next, finger image normalization is performed (S312). One example of finger image normalization is to correct the finger thickness and 3D tilt to a constant value based on perspective projection transformation, or it can also be corrected using the landmark-based method implemented in face normalization as described above. For example, as a posture correction process to normalize the thickness and orientation of all detected fingers, an image shall be generated that includes the fingertip point and the two finger crotches on both sides of each finger internally, rotated so that the central axis of the finger is parallel to the horizontal axis of the image, and scaled so that the finger width of each finger is a constant value. This unifies the orientation and thickness of the fingers on the image as they appear in the ROI image for all fingers.

Next, feature extraction unit 25 is activated to perform finger feature extraction (S313). Feature extraction of fingers can be performed in the same way as the feature extraction of faces described above. As finger features, finger veins, fingerprints, joint crests, epidermal crests, melanin crests, fat crests, etc. may be extracted independently, or they may be mixed.

Another feature extraction method is to use a filtering process such as a general edge-enhancement filter, Gabor-filter, or matched filter to enhance biological features such as line pattern features of epidermis and blood vessels or speckled features of fat lobes, and then binarize or trivalue the result to obtain biological features. The results can then be binarized or trivalued to obtain biological features. Alternatively, luminance gradient features can be acquired by extracting luminance gradient features from key points, such as SIFT (Scale-Invariant Feature Transform) features. In any case, any feature that can extract biological features from an image and calculate their similarity to each other is acceptable.

Next, the quality value of the finger image is calculated (S314). One example of calculating the quality value of the finger image is to perform finger posture detection, which extracts information on the tips, roots, and widths of multiple fingers from the finger image, and determine whether the posture of the fingers at that time is appropriate. In the finger posture judgment, based on the results of finger posture detection, the evaluation items are that the fingers are in the proper position and that the fingers remain still for a certain period of time by checking that they have not deviated significantly from the displayed finger guide.

As an example of finger stationary detection, it is sufficient to confirm that the finger posture information such as the fingertip position does not change over time. Since it is difficult to keep the finger completely still, the finger may be judged to be still if it is within a certain range of movement. If the finger is still not stationary, or if the finger is too far away from the camera (i.e., the finger is too far from the camera and the hand appears small), or if the posture is not appropriate, a guide display to that effect is displayed, and the process (S309), which is omitted in the figure, may return to the process of prompting the finger presentation again.

A data adequacy judgment may also be performed during this process to detect that the pattern extracted is appropriate and that the finger captured is not a foreign object or a forgery. If the result of this judgment is not appropriate, the quality value is greatly reduced so that it is not selected as a candidate. As an example of the data adequacy judgment process, if a pattern that is a line feature but highly continuous, such as a blood vessel pattern, cannot be extracted, or if a strong edge that would not be observed on a real finger is observed in the original image, the pattern extraction fails, or the input is a forgery. The system can dismiss this as a failure to extract the pattern or as a forgery input. Alternatively, the method can be used to detect pulsations in image brightness caused by changes in finger blood flow from the moving image and reject the image if no pulsations can be detected.

Next, a finger registration decision is made (S315). This judgment is based on the quality value of the finger image as described above, and the method can be implemented in the same way as the method based on the quality value of the face image described above.

These steps (S309 to S315) are repeated to determine if registration candidates have been accumulated three times (S316), and if three have been accumulated, the registration selection process is performed (S317). The number of registration candidates is not limited to three.

One example of the registration selection process is a method in which the feature data of three registration candidates are collated in a round-robin manner to calculate the similarity between each candidate, and the one registration candidate with the highest total of two similarities with the other candidates is selected as the registration data. According to this method, the most easily reproduced and stable feature data among the three times taken is registered, thus improving the authentication accuracy.

However, if the similarity between the registration data selected at this time and two other candidates is a value that is not recognized as the same pattern in both cases, it is assumed that the three registration candidates were all unstable biological features, and no registration data was determined. Then, it determines whether one feature data that is considered suitable for registration has been determined (S318), and if so, the feature data of the finger at that time and the feature data of the face obtained in the previous step are linked to the registrant ID entered by the registrant at the start of the registration process and stored in storage device 14 as the registration data of biometric features (S319). On the other hand, if no decision is made, the process is repeated until timeout (S320), and if timeout occurs, the process ends with a report of the failed registration situation (S321).

Next, the flow of the authentication process in FIG. 4 is described. The authentication process is a process in which a user whose personal biometric features have already been registered through the registration process (basically, the user is assumed to be the same user during the authentication process) is authenticated by the biometric authentication system 1000 as the registered individual.

The authentication process takes an image of the living organism presented by the user, extracts the features of the living organism, compares them with each feature data of the registration data, and outputs the authentication success result and the registrant ID if there is registration data that can determine the identity of the user, or outputs an authentication failure notification if there is no registration data that can determine the identity of the user.

The authentication processing unit 21 is activated by the user's instruction to start the authentication process, and a preview image is displayed (S401) indicating that authentication has started. For example, "Start taking pictures of the left hand" is displayed. The user can grasp the series of steps in the authentication process by the preview image displayed.

Although both the face and hand/finger are captured for authentication, as described in FIG. 2 above, the user is often in front of a terminal such as a notebook PC, so the face can be captured without the user being particularly aware of it, and the user can be guided to only photograph his/her left hand. This allows users to prepare in advance to hold up their left hand for smooth biometric authentication. In addition, a preview image of the camera is displayed in the same way as in the registration process.

Next, the face detection process (S402) is followed by the calculation of face image quality values (S406) for a predetermined period of time. These processes are similar to the face detection process (S302) to the calculation of face image quality values (S306) in the registration process in FIG. 3, so we omit the explanation.

Then, the face feature values with face image quality values that exceed certain predetermined criteria are recorded in the memory 12 (buffer) of the authentication processing device 10 (S407). The process up to this point is then repeated for a fixed amount of time (S408). The display of the guide text may continue to be performed during these processes.

This series of processes (S402 to S408) is related to the dedicated shot of face, face-only phase and is referred to here as the "Face Shot Phase" as the first period.

Although the face shot phase is set to a fixed time here, this phase may be terminated when a certain number of high-quality face feature values are collected in the buffer or when a face is successfully matched with the registration data by itself. The advantage of a fixed time, however, is that if the loop is repeated until face feature values of high quality are obtained, it may take too much time to complete this phase if the shooting proceeds in an environment where quality values are difficult to increase, resulting in a delay in authentication. On the other hand, limiting this phase to a certain time has the advantage of reducing the delay. Furthermore, if the time to complete this phase varies depending on the quality value, the quality value may be guessed, which may be misused to create a counterfeit, and this can be prevented.

Next, as shown in FIG. 6C, for example, a finger guide prompting the user to hold up a finger is displayed (S409), followed by the face and finger detection process (S410) to the calculation of quality values for the face and finger images (S414). These processes are almost the same as the registration process in FIG. 3 and the face shot phase in FIG. 4, with the only difference being that both face and finger biometric features are processed.

Next, the face feature values are buffered (stored) in the memory 12 (buffer) of the authentication processing device 10, and the stored face feature values are selected (S415). Here, as in the registration process in FIG. 3, the face feature values that have reached a certain quality value are buffered, and the face feature values to be used in the matching process to be conducted in a later stage are selected from the buffer.

An example of a selection method will be discussed in detail later using FIG. 7. In any case, if we can preferentially select the face features in the buffer that are more likely to succeed in authentication, it will be possible to achieve successful authentication at an early stage.

In addition, as described below, the face posture of the buffered face features captured in the face shot phase is relatively easy to face forward, and since the face is in the phase before the hand is held up, it is difficult for the face image to be missing due to shielding. This has the advantage that a high-quality face image is more likely to be selected than a face image obtained by holding both the hand and the face at the same time.

Thereafter, it is confirmed that both face and finger quality values are sufficiently high (S416), but if either quality value is lower than a certain value, the process starts over again from the face and finger detection process (S410) and repeats until face and finger feature values suitable for use in the authentication process are obtained. This repetitive interval is called the "Multi-shot phase" as the second period of time. The face features in the face shot phase and the multi-shot phase are calculated at different times for the same area of the same user. The finger feature values in the "Multi-shot phase" are calculated for a different region of the same user than the face.

The face shot phase and multi-shot phase face feature values are values obtained from the images of faces captured. For example, if the captured image is a video with 30 frames per second, 30 face feature values can be calculated per second. The same is true for the multi-shot phase finger feature values.

When it is confirmed that the quality values of the face and finger images are both high, the face and finger feature values are fused together, and the collation unit 26 is activated to sequentially match the authentication data of the face and finger feature values obtained by the process shown in FIG. 4 with one or more registered data (usually assuming that multiple registrants are registered) that has been previously registered in storage device 14. The authentication data of the facial and finger feature values acquired by the process shown in FIG. 4 are sequentially matched with one or more registration data (usually assuming that multiple registrants have been registered) that have been registered in the storage device 14 in advance, and a matching score is acquired (S417).

The matching process may separate the finger and face feature values internally, calculate the matching score as the degree of difference between each registered feature value, and finally obtain the result of weighted summing of those matching scores, or it may match the finger and face feature values with the registered data without separating them. It may also confirm the match with the registration data based on information converted from the biometric features to encrypted features by, for example, PBI (Public Biometric Infrastructure) technology. The matching score may be a scalar or vector value, and its value may be binary or multi-valued.

Finally, an authentication judgment is made based on the calculated matching score (S418). As an example of a judgment/decision, there is a method to perform a decision level fusion judgment based on AND judgment, in which the matching score of the face feature alone and the matching score of the finger feature are acquired respectively, and when both matching results (degree of difference) are below a threshold where similarity with the registered person is recognized, the person is finally judged to be the registered person him/herself.

This decision method requires that both biometric features be similar to the registrant and has the effect of reducing the stranger acceptance rate, which erroneously judges a non-registered stranger to be the registrant.

Similarly, the decision level fusion decision can be based on the OR decision, which determines the registrant's identity when either the face or finger matching score is below the threshold where similarity with the registrant is recognized. In this case, the rejection rate, in which the person is mistakenly rejected, can be reduced because authentication is only required to be successful for either of the two biometrics.

These can be set arbitrarily according to the security policy of the authentication system. It can also be used as a score level fusion judgment that linearly combines the matching scores of each organism, or it can be used to treat the matching scores of each organism as a two-dimensional matching score vector, define a threshold boundary hyperplane in multidimensional space, and judge that the matching score vector is similar to the registration data if it is contained in an area where the identity of the person can be judged. If the matching score vector is included in the area where the identity can be determined, it can be judged as similar to the registered data. In particular, the method of treating it as a vector allows the authentication threshold to be set flexibly, and if there is a correlation between the collation scores of each organism, the boundary can be defined according to that correlation, thus realizing highly accurate authentication judgment.

In the finger matching process, the similarity to the registration data (epidermal and venous features of one registration data) may be calculated for the extracted epidermal and venous features, respectively.

Finally, if the data is determined to be similar to the registration data, the successful authentication result and the registrant ID associated with the relevant registration data are output (S419). If not, the authentication attempt is continued by repeating the multi-shot phase until the authentication process times out (S420), and if the timeout occurs, a notification that authentication with all registered data failed (i.e., that the registrant could not be authenticated as the registrant him/herself) is output and the authentication process is terminated (S421).

Although we have described 1:N authentication, in which one registrant is determined from multiple registrants, it goes without saying that 1:1 authentication can also be used, in which a registrant ID is specified in advance before authentication, and then the identity of the registrant is verified.

The authentication judgment (S418) may be made on the basis of consecutive matches with the registration. In this case, even if the first authentication judgment matches the registration data, the authentication does not become successful. This prevents the error of accepting another person, which may result in accidental success of authentication, and thus realizes a stable and highly accurate authentication.

In this embodiment, the face and finger features are fused as shown in S417, but the method can also be used to match the face alone and the finger feature alone, which is described later in FIG. 9. The advantage of fusing both features is that it can increase the strength of the attack by inputting a large number of forged face and finger images. If an authentication system is designed so that the face and finger features can be matched separately, the results of each can be checked independently, and if forgeries that have been successfully attacked independently are used at the same time, the multimodal authentication will also be successfully attacked. On the other hand, if the feature values are fused so that they cannot be matched individually, the attack on multimodal authentication can succeed only when both are attacked successfully at the same time, which requires countless attempts to combine both, resulting in a combinatorial explosion that increases the difficulty of the attack. To suppress such fraud, the feature level fusion method, in which both feature values are fused before matching, is effective.

FIGS. 5A-E show an example of a screen transition diagram during authentication for a multimodal biometric authentication technique that simultaneously guides the face and fingers. Unlike FIG. 4 above, this section describes a typical case of authentication failure that occurs when the face and fingers are guided simultaneously without a face shot phase and without buffering of the face image.

Figure 5A:
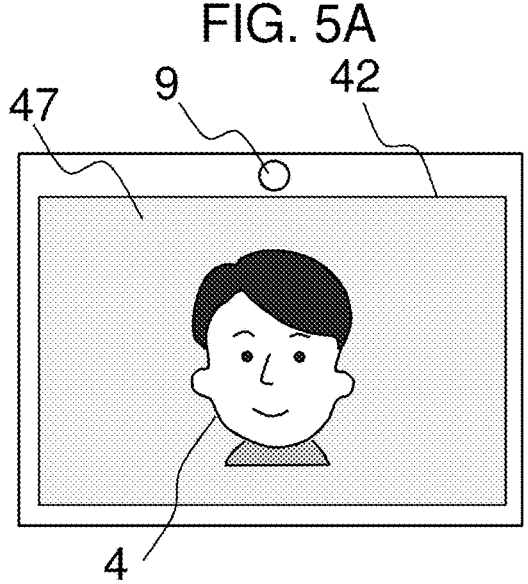
FIG. 5A is an example of a screen transition diagram during authentication for multimodal biometric authentication technology that simultaneously guides and authenticates the face and fingers.

FIG. 5A is a preview image 47 immediately after the user launches the authentication screen to login to the notebook PC. As mentioned above, the user is often positioned in front of the terminal, and because camera 9 focuses on the front of the display 42, the user's face 4 is captured near the center of the image being captured.

Figure 5B:
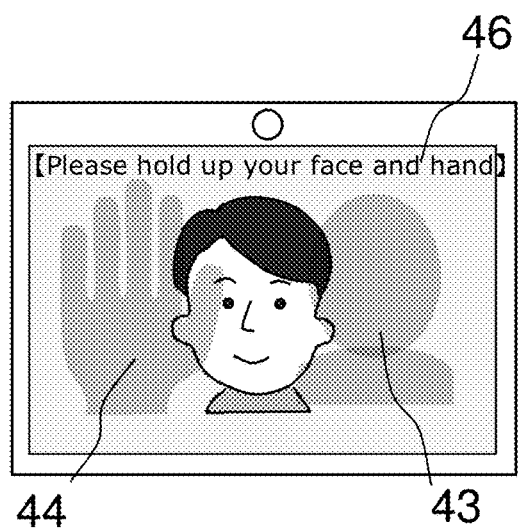
FIG. 5B is an example of a screen transition diagram during authentication for multimodal biometric authentication technology that simultaneously guides and authenticates the face and fingers.

Next, as shown in FIG. 5B, the face guide 43 and finger guide 44 are displayed for holding the face and hand simultaneously. To guide the user to hold the face and left hand at the same time, the finger guide 44 is displayed on the left side of the screen and the face guide 43 on the right side of the screen, and the guide message 46 guides the user to hold each organism within the frame.

Figure 5C:
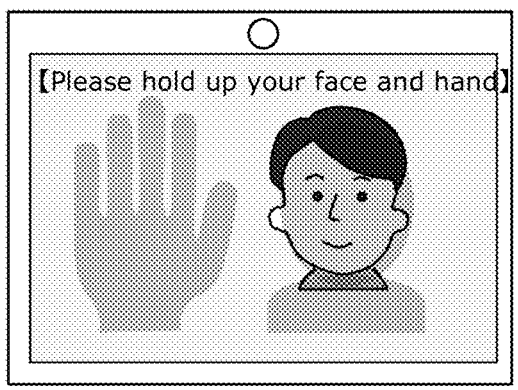
FIG. 5C is an example of a screen transition diagram during authentication for multimodal biometric authentication technology that simultaneously guides and authenticates the face and fingers.

The user first holds his/her face in the correct position while checking his/her face 4 and face guide 43 in the preview image 47 as shown in FIG. 5C.

Figure 5D:
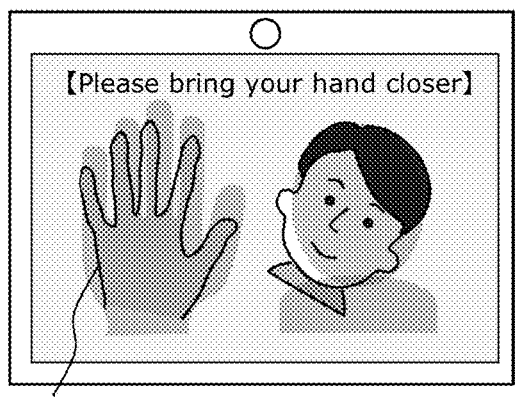
FIG. 5D is an example of a screen transition diagram during authentication for multimodal biometric authentication technology that simultaneously guides and authenticates the face and fingers.

Then, as shown in FIG. 5D, the user holds his/her left hand 45 in alignment with the finger guide 44. At this time, the user holds his/her left hand in front of the face. At this time, the user's left hand may block the view, making it difficult to see the screen. The user may tilt his/her head to the side as shown in FIG. 5D in order to maintain the field of view. In this case, the face may not be detected correctly, or the face may not be recognized as a registered face because the face is captured in a different posture than when it was registered, resulting in changes in face feature values.

Figure 5E:
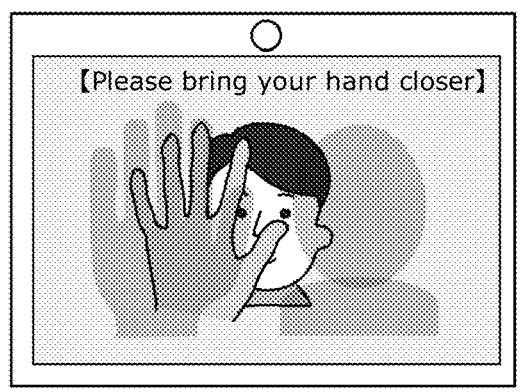
FIG. 5E is an example of a screen transition diagram during authentication for multimodal biometric authentication technology that simultaneously guides and authenticates the face and fingers.

Alternatively, as shown in FIG. 5E, the user may be looking at the screen from between the fingers of the left hand in order to maintain a clear view, but in this case the face is hidden by the hand, making it impossible to capture a correct face image. In addition, the color of the finger is often similar to the color of the face, but if a face is present immediately behind the finger, the boundary between the finger and face becomes blurred, which may make it difficult to detect the finger and prevent accurate implementation of finger detection. In any case, it will not be possible to capture face images of the same quality as the registered face images.

Thus, in face and hand multimodal biometric authentication technology, which only involves a phase in which the face and hand are held up simultaneously, the degradation of authentication accuracy due to holding up multiple organisms simultaneously is a challenge.

FIG. 6A-E shows an example of a screen transition diagram of face and finger multi-modal biometric authentication technology including face shot phase, as shown in FIG. 4 above. Here, we explain the case of logging in to the same notebook PC as in FIG. 5A-E above.

Figure 6A:
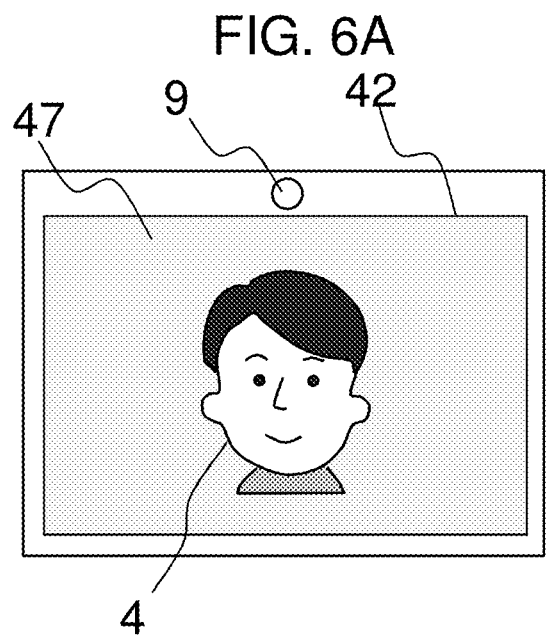
FIG. 6A is an example of a screen transition diagram during authentication for the multimodal biometric authentication technology of Embodiment 1, in which the face and fingers are simultaneously held up for authentication.

First, as shown in FIG. 6A, when the user starts the authentication screen to login to the notebook PC, the authentication system starts camera 9 to take a picture of the user's organism. The image is presented to the user as a preview image 47 in the same way as in FIG. 5 above.

Figure 6B:
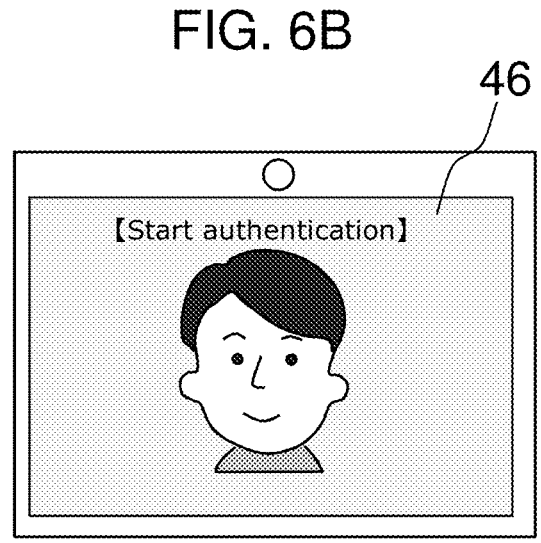
FIG. 6B is an example of the screen transition diagram during authentication for the multimodal biometric authentication technology of Embodiment 1, in which the face and fingers are simultaneously held up for authentication.
Figure 6C:
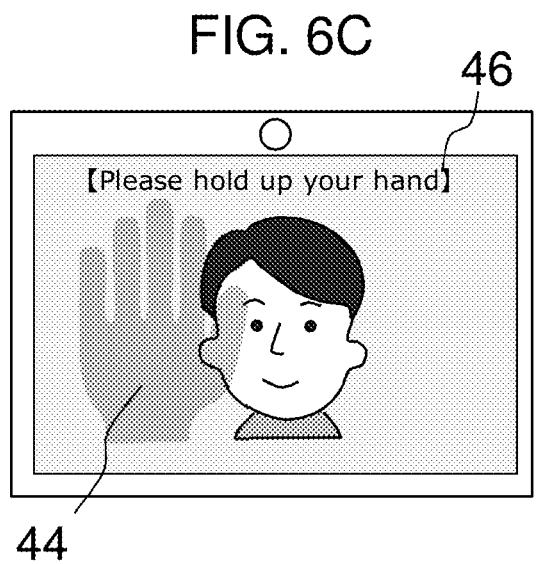
FIG. 6C is an example of a screen transition diagram during authentication for the multimodal biometric authentication technology of Embodiment 1, in which the face and fingers are simultaneously held up for authentication.

Next, as shown in FIG. 6B, guide message 46 is displayed for a certain period of time as a preview image 47 to indicate that authentication is to be performed. The fixed time can be set to any number of seconds, for example, 1 second. At this time, the user does not need to adjust his/her face or hands to the guide, but this is the face shot phase shown in FIG. 4, and the authentication system is capturing the face, extracting features, and calculating quality values without the user being aware of it. As mentioned above, in the face shot phase, the user is in front of the notebook PC and does not hold his/her hand over it. Therefore, the user does not tilt his/her face, nor is it obstructed by the hand. Therefore, the user can take a high-quality face image without being aware of it.

After a certain time has elapsed, the camera moves to the multi-shot phase, which displays a finger guide 44 for holding the left hand over the camera as shown in FIG. 6C. The face guide may be omitted in this embodiment.

Figure 6D:
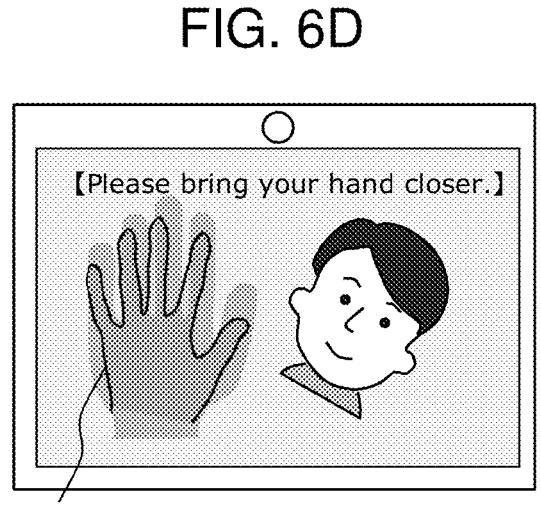
FIG. 6D is an example of a screen transition diagram during authentication for the multimodal biometric authentication technology of Embodiment 1, in which the face and fingers are simultaneously held up for authentication.

The user holds the left hand at the correct position while checking the image of himself and the guide for the left hand as shown in FIG. 6D. As mentioned above, since the hand is held in front of the face, the guide screen may be difficult to see, and the user may tilt his/her head to the side to secure the view obstructed by the hand. In this embodiment, since relatively high-quality face images are captured and buffered in the face shot phase, there is no significant impact even if the posture of the face varies during this phase.

Finally, multimodal biometric authentication is performed by combining the face image in the buffer and the finger image taken in the multi-shot phase, and both can be authenticated with high quality features. Of course, if the face image taken in the multi-shot phase exceeds a certain quality value, the face image taken in the multi-shot phase can be used for authentication. In other words, face images taken in the face shot phase and multi-shot Phase can be used as information for authentication, and by increasing the data that can be compared with the registered authentication data (face feature values), a highly accurate and high-speed authentication process can be achieved. "Multi-shot phase" is a phase in which the face image taken is used as information for authentication.

Therefore, in this embodiment shown in FIG. 4 and FIG. 6A-D, the possibility of successful authentication is increased without being affected by fluctuations in the tilt of the face when the hand is held over the screen, and the user can concentrate only on holding the hand over the screen even when multiple bodies are held over the screen at the same time, thus providing highly accurate and convenient multimodal biometric authentication. This allows for highly accurate and convenient multimodal biometric authentication. Another advantage of the face shot phase and multi-shot phase is that the hand position is generally in front of the face position, and since the distance of the hand and face from the camera is different, it may be difficult for the camera's focus control to focus on both the hand and face at the same time. Therefore, as in this embodiment, the face shot phase focuses on the face and the multi-shot phase focuses on the hand, so that both living bodies can be captured optimally. In order to capture multiple biological features at the same time with optimal focus, not only the face and hands, for example, multiple images with different focal points are captured in a short period of time, and the blur of the entire image is corrected by estimating the PSF (Point Spread Function) based on the difference in the degree of blur between the images, An all-in-focus image in which all subjects are in focus may be generated. This allows multiple biological features to be captured clearly.

In this embodiment, the face shot phase is assumed to transition to the next multi-shot phase in a certain period of time. However, the face may be matched to the registration data in the face shot phase on its own and transitioned to the next phase when it is confirmed that the face matches the registration data. The next phase may also be moved to the next phase when a predetermined number of face images exceeding a predetermined quality value have been collected.

In such a case, the next phase is moved when it is determined that face recognition will definitely succeed or when the possibility of successful face recognition increases, which has the advantage of reducing the shooting time while at least suppressing the deterioration of face recognition accuracy.

However, the disadvantage of the face-only matching method is that, as mentioned above, there is a possibility that information used to create a counterfeit may be leaked. For this reason, a face shot phase is always provided for a certain period of time to prevent the user from guessing whether the face authentication was successful or not. For example, if a large number of face images are forged and presented, forgery can be made more difficult by making it impossible to infer from the behavior of the authentication system whether or not the authentication is successful at least for a single face. Either method can be adopted arbitrarily according to the security policy of the authentication system.

As shown in FIG. 6C, only the finger guide 44 is displayed in the multi-shot phase, but as another example, the face guide can also be displayed on the right side. In this case, the effect is to move the face to the right. As another example, only the finger guide 44 can be displayed for a certain period of time to repeat face and finger multimodal authentication, and if the authentication is not successful after a certain period of time, the face guide can be additionally displayed. In this method, only the hand guide is initially displayed so that the user can focus on aligning the hand, while if the multi-modal authentication is not successful because of failure to capture the face, the user is expected to move the face position away from the hand position. This may result in a more successful authentication of the hand or increase the likelihood of a successful authentication due to more variations of the face.

Figure 7A:
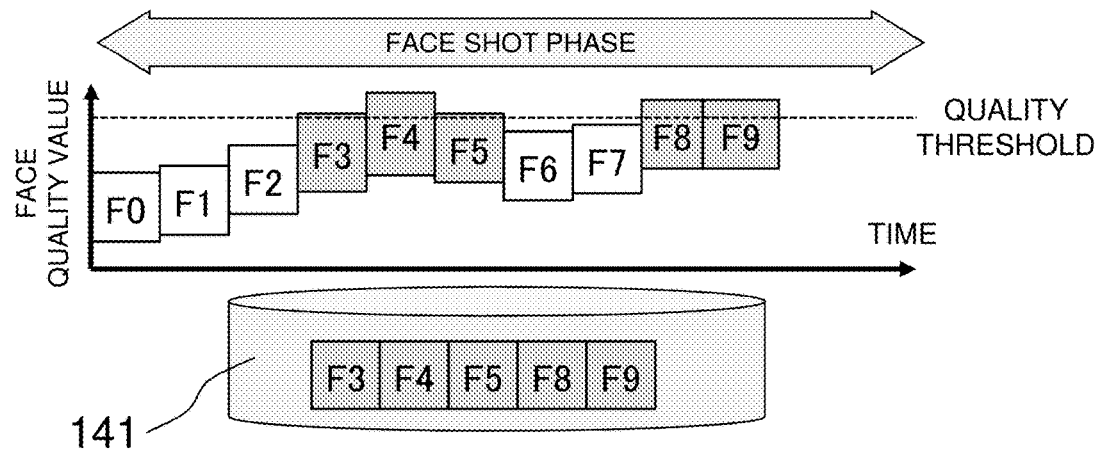
FIG. 7A is an illustration of one method of buffering and selecting face features for Embodiment 1.
Figure 7B:
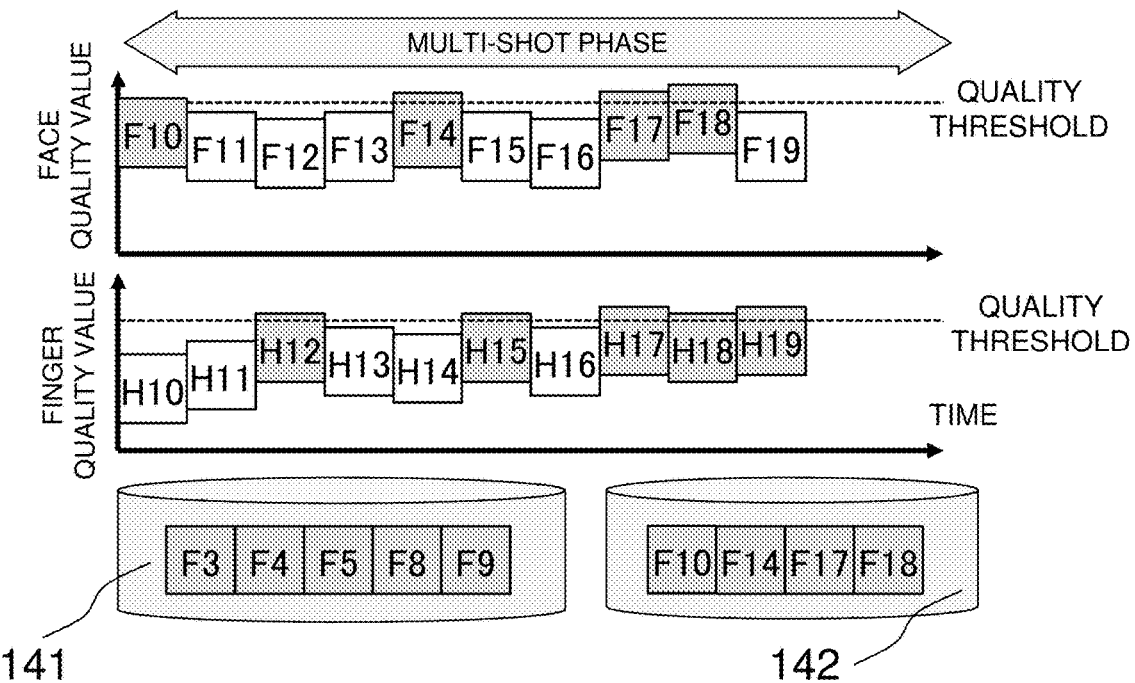
FIG. 7B is an illustration of the buffering and selection process of face and finger features for Embodiment 1.
Figure 7C:
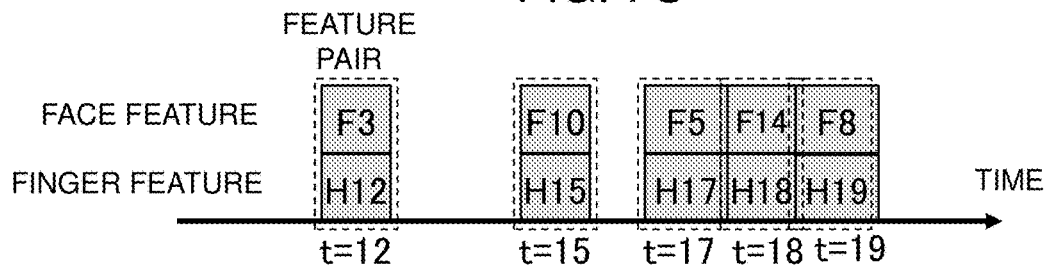
FIG. 7C is an illustration of one method of feature pair generation based on face and finger features.

FIG. 7A-C illustrates one method of buffering and selecting face features in FIG. 4 proposed in this embodiment.

FIG. 7A is a time-series plot of face features and their quality values in the face shot phase, and schematically represents the part of the process corresponding to S405 to S408 in FIG. 4 above.

The horizontal axis is time, and the vertical axis is quality values, showing the transition of quality values when the face feature value at time t is Ft. A threshold value that can be judged to be of high quality (high quality threshold) is set, and the feature values that exceed this threshold value are buffered. In this figure, the face feature values F3, F4, F5, F8, and F9 exceed the high-quality threshold, and it can be seen that the face feature values F3, F4, F5, F8, and F9 are selected and stored in chronological order in the face feature buffer 141 in the face shot phase.

As shown in FIG. 7B, the quality values for the face and finger features can be plotted in time series. In this embodiment, F10, F14, F17, and F18 are assumed to be high quality face features, and you can see how they are stored in buffer 142 of the multi-shot phase face features. Although not shown in FIG. 7B, the face features F10, F14, F17, and F18 are also stored in chronological order in the buffer 141 of face features.

Ht indicates the finger feature values, where H12, H15, H17, H18, and H19 are assumed to exceed the high-quality values. In this embodiment, the buffers are explicitly shown separately for the face alone and for the multi-shot phase, but it goes without saying that the same buffer can be used to manage them. Also, although no buffer is provided for finger features in this embodiment, the finger may be buffered in the same way as for faces, and the finger features to be used may be selected following the selection method described below.

Then, the feature selection process for the face and finger features, which is performed in S415 and S416 in FIG. 4. as shown in FIG. 7A and FIG. 7B, each face and finger feature is not always of high quality, only one of them may be of high quality, both may not be of high quality, or both may be of high quality. If the design is such that authentication is performed only when both features are of high quality, there is no particular need to buffer the features, but on the other hand, as shown in FIG. 7B, in this embodiment, there are only two opportunities for authentication at time t, 17 and 18. Therefore, the authentication is more likely to fail.

Therefore, in this embodiment, as shown in FIG. 7C, a face feature and a finger feature are selected from the buffered features and combined, i.e., a feature pair (fused feature) is generated to increase the chances of authentication, and as much authentication processing is performed as early as possible and as much as possible.

The feature pair selection method in this embodiment, illustrated in FIG. 7C, is explained here.

First, if a finger feature has a quality value higher than the threshold value, it is always a candidate for selection. The face features are first selected from the buffer of the face shot phase, and then selected from the buffer of the multi-shot phase on the next occasion, and so on. In addition, each buffer is selected in order from the most recent to the most recent in time. However, if the most recently selected features are chronologically consecutive, the next most recently stored feature shall be selected because the two features are likely to be similar.

As shown in FIG. 7C, H12 is first selected as the finger feature, and F3, the most recently stored feature in the face shot phase buffer, is selected as the face feature to be paired with H12. First, at time t=12, the finger feature of H12 and the face feature of F3 are paired and the matching process is performed. In other words, the feature pair is used to perform the matching process based on the face and finger feature values for each user stored in the storage device.

If the authentication is not successful, H15 is next selected as the finger feature, and since the face feature to be paired with H15 was selected from the buffer of the face shot phase earlier, it is selected from the buffer of the multi-shot phase here, and F10, the most recently stored of the two, is selected. F10 is selected.

If the authentication is still unsuccessful, H17 is selected at time t=17, and the face features to be paired with H17 are selected from the buffer of the face shot phase because the buffers are switched alternately. Since F3 was selected earlier, F4 could be a candidate if the selection is performed in chronological order. However, as mentioned above, F3 and F4 are consecutive in time, so F5 is selected by skipping one. In other words, H17 and F5 are paired, and the matching process is executed.

Similarly, the face feature pair for H18 is selected from the buffer of the multi-shot phase, and since F10 was selected earlier, F14 is selected next this time. Finally, H19 and F8 are selected as a pair.

The advantage of alternately selecting face features in the face shot phase and the multi-shot phase is that variations in face features can be increased by incorporating not only the face images of the face shot phase buffered in the past but also the multi-shot phase face images at the present time when facial postures are expected to be different. The advantage of this method is that the variation of face feature values can be increased by incorporating not only face images from the face shot phase buffered in the past, but also face images from the current multi-shot phase, which are assumed to have different facial postures. This is expected to increase the likelihood of successful authentication.

Similarly, by skipping feature values extracted from consecutive time frames among the buffered face feature values, it has the effect of increasing the variation of feature values rather than using feature values that change little and is expected to increase the success rate of authentication and shorten the time until successful authentication. This is expected to increase the success rate of authentication and shorten the time required for successful authentication.

In this embodiment, matching is performed by combining face and finger features with different temporal timing. However, from the viewpoint of more robustly preventing attacks by counterfeiters, a method in which authentication is successful only when multiple biometric features similar to the registration data are observed simultaneously (i.e., simultaneously present in the same image) is considered. For example, FIG. 7 shows a case where two or more biometric features similar to the registration data are observed simultaneously. Therefore, for example, at the time when the finger feature H17 was obtained in FIG. 7C, a process may be performed to confirm that the face feature F5, which is to be combined with the finger feature H17, is the same person as F17 (high similarity), utilizing the face feature F17 obtained at the same time. If the face image at the current time and the face image taken during the face shot phase are replaced, the authentication can be deemed to be fraudulent and not succeed, making the authentication system more secure.

In the example above, the buffered face features were arranged in chronological order, but they can also be arranged in order of the quality value of the face images and used in that order. In registration, face images are selected so that the quality value increases as much as possible. Therefore, if the quality value of a face image is high, it is likely to be similar to the registered data. Therefore, by fusing the face features in order of increasing quality value, the probability of successful authentication can be increased as early as possible. At this time, the time of acquisition as well as the feature values and quality values are buffered, and if the feature values currently being selected and the previously selected feature values are close in time, as described above, one can be skipped.

The face features in the buffer may be cross-checked against each other, so that features with high similarity are not selected, i.e., features at different times are thinned out.

Although the quality values include parameters related to the orientation of the face, they may be selected in such a way that there is some variation in the orientation of the face. For example, an image with a face pitching angle slightly upward from the frontal plane may be selected next to an image with a face pitching angle slightly downward, or an image with a face yawing angle slightly leftward from the frontal plane may be extracted alternately with an image with a face yawing angle slightly to the right. This has the effect of increasing the success rate of authentication at an early stage, since the features with different face orientations can be used exhaustively for matching.

In either selection method, avoiding the continuous selection of similar face features has the effect of increasing the success rate of authentication at an early stage by allowing as many variations of face features as possible to be used for authentication at the earliest possible stage.

When all the face features in the buffer have been used as described above, the face features in the buffer may be reused again, starting from the top. At this time, if there are feature values that were not selected as described above, they may be used preferentially, or the number of times each feature value was selected may be recorded and the feature values with the lowest number of selections may be reused preferentially.

As described above, the feature pairs of authentication data (face features and finger features) that are matched with the registered face features (face features) and finger features (finger features) in the authentication process are obtained by combining the face features acquired in the face shot phase with the finger features acquired in the multi-shot phase. The feature pairs of authentication data (face and finger features) are obtained by combining the face features obtained in the face shot phase and the face features obtained in the multi-shot phase with the finger features obtained in the multi-shot phase. This provides the effects described above. In particular, it has the effect of increasing the variation of feature values, increasing the success rate of authentication, and reducing the time until successful authentication.

Figure 8A:
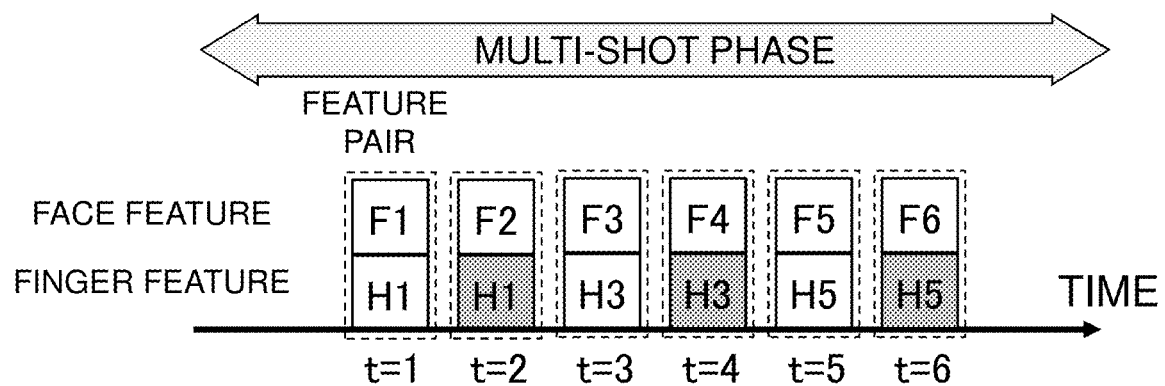
FIG. 8A shows an example of multimodal biometric authentication technology based on alternate authentication using face and fingers.
Figure 8B:
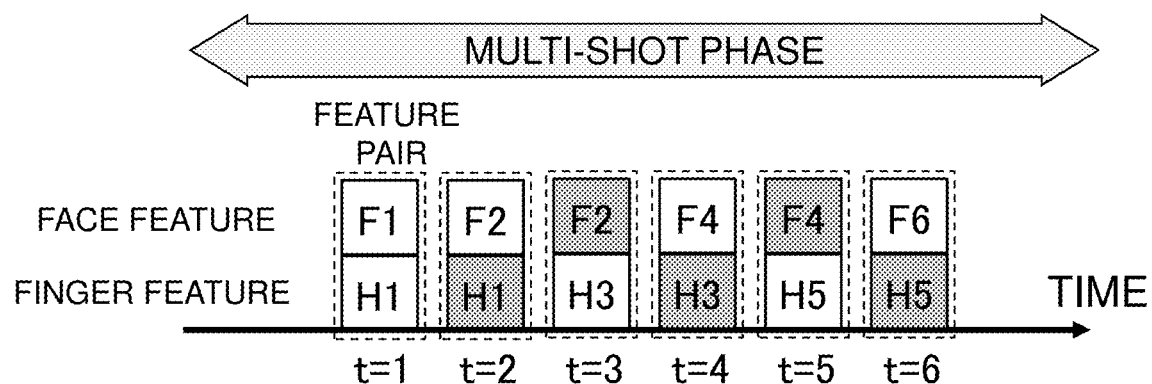
FIG. 8B shows an example of multimodal biometric authentication technology based on alternate authentication using face and fingers.

FIGS. 8A-B illustrate an example of multimodal biometric authentication technology using alternate authentication with face and fingers.

As described above, in the multi-shot phase, the user holds up the face and hand simultaneously, and multimodal biometric authentication is performed through face detection and feature extraction of the face, and finger detection and feature extraction of the finger. In this case, the simultaneous processing of the face and finger may degrade performance.

Therefore, in this embodiment, feature extraction of the fingers is performed skipping one frame, as shown in FIG. 8A. The horizontal axis represents the passage of time t, and Ft and Ht indicate the face and finger feature values, respectively. It can be seen that H1 is used for the finger feature at time t=2, the same as at time t=1. In other words, at time t=2, no detection or feature extraction processing is performed for the finger, and the finger feature values of time t=1 are used as they are. In this embodiment, processing time is longer than that for face matching because feature extraction is performed for a maximum of four fingers and matching is performed for each finger one by one. Therefore, the process of extracting finger feature values every other frame is simplified by taking advantage of temporal locality, which means that feature values close in time are less likely to change significantly. This simplifies the process, i.e., speeds up the authentication process, without degrading the accuracy of authentication as much as possible.

As shown in FIG. 8B, it is also possible to simplify the processing of not only fingers but also faces to every other frame. As in FIG. 8A, the previous finger feature is reused when the time is even, while the previous face feature is reused when the time is odd in the case of face features. Since each feature pair is processed alternately, a new feature pair is always generated. This reduces the average processing time by half while always generating new feature pairs. This allows the user experience to be improved with almost no degradation in authentication accuracy.

Second Embodiment

In Embodiment 1 above, we described an example of processing when a matching method based on feature level fusion that simultaneously uses both face and finger feature values is employed. In Embodiment 2, each organism is matched to an individual. Embodiment 2 describes a case in which each organism can be matched independently.

Figure 9:
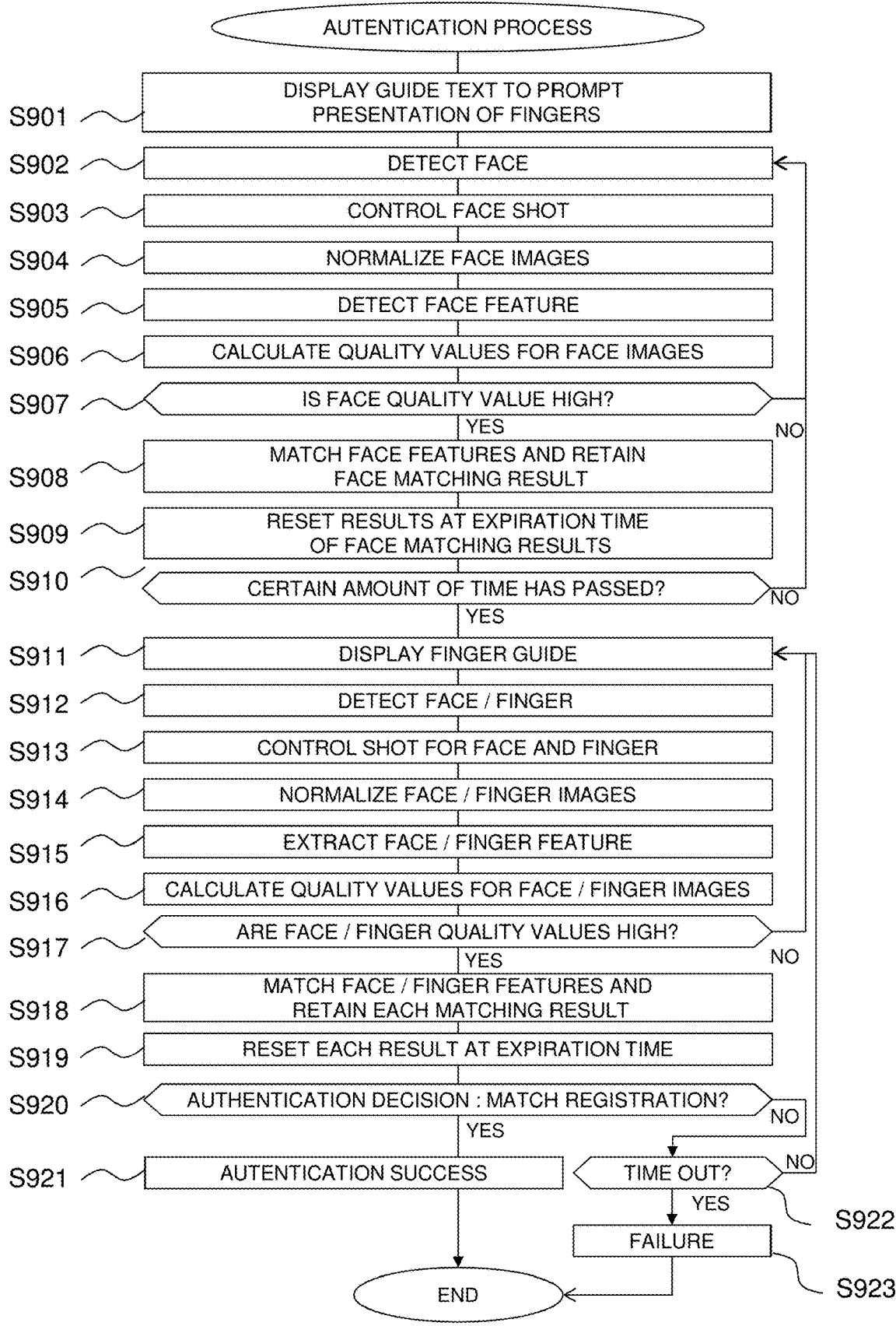
FIG. 9 shows an example of the processing flow of the authentication processing unit of the biometric authentication system that can match a face and a finger by itself.

FIG. 9 shows an example of the processing flow of multimodal biometric authentication in which the face and finger are matched independently. While FIG. 4 above is an example of fusion of face and finger patterns, FIG. 9 is a process flow when matching is performed on the face or finger alone and the results are fused to a score level. The registration process can be performed in the same way as in FIG. 3, so we omit the explanation.

First, from the display of the guide text prompting the user to present the finger to the calculation of the quality value of the face image (S901-S906) is equivalent to FIG. 4, so the explanation is omitted. Then, if the quality value is higher than the standard (S907), the face feature values alone are matched with the registration data, and the face matching results at that time are retained (S908). The face matching result may be a matching score indicating similarity with the registered data, or it may be the result of a match or mismatch with the registered data as determined by the threshold process for the matching score.

Next, the results are reset according to the expiration time of the face matching results (S909). In this embodiment, the face matching results obtained at a certain time are retained for a predetermined period of time, and after that time, the results are invalidated. Here, the fixed time to retain the results is called the expiration time, and invalidating the results is called resetting.

In multimodal biometric authentication, in which multiple biometric features are independently matched, a successful or unsuccessful match can be obtained for each of multiple modalities, but if the matching is repeated until all the modalities are successful at exactly the same time, the authentication time may be long. In contrast, by setting an expiration time for each matching result and assuming that once a successful matching is performed, the matching is always successful within the expiration time, the possibility of a successful authentication in all the modalities is increased, thereby increasing the success rate of authentication and reducing the processing time until authentication is performed. At this time, if a successful collation is made permanently valid, for example, if a stranger accidentally succeeds in authenticating one modal, it is easy for a false stranger acceptance to occur if the result is made permanently valid.

Therefore, results that exceed the expiration time are invalidated by resetting to suppress acceptance by others. The expiration time can be a value such as 0.5 seconds or 1 second, for example. The process is repeated until a certain amount of time has elapsed (S910). Although multiple matching results are obtained by this repetition, all matching results within the validity period are recorded as described above. The loop from S902 to S910 is the face shot phase as in FIG. 4.

Next, the system enters a loop of processing (S911-S917) to confirm that the quality values of the face and finger are sufficiently high from the finger guide display, which is basically the same process as in FIG. 4. In this embodiment, however, the processing for the modals that have been successfully matched within the validity period at this time is omitted. In other words, if the face features are sufficiently similar to the registered data at this time, i.e., the face alone can be judged to have been successfully authenticated within the validity period, the face matching is omitted. Similarly, if there is a result within the validity period that can be judged to be sufficiently similar to the registered data in the matching of the finger feature values, the finger matching can be omitted. In this way, each matching score is recorded chronologically (S918) while the matching process is carried out at high speed only for those face or finger features that have not been confirmed to be sufficiently similar to the registered data. Reset processing of each result is performed according to the expiration time of the face and finger matching results in the same manner as described above (S919). Then, an authentication judgment is made by score level fusion using the set of matching scores obtained so far (S920). If the judgment results in successful authentication, the authentication success is processed (S921) and the authentication process is terminated. If the authentication fails, the system determines whether or not a timeout has occurred (S922), and if not, repeats the process from the finger guide display, but if a timeout has occurred, the authentication failure process is performed (S923) and the authentication process ends.

One example of authentication judgment by score level fusion using a set of matching scores, which is performed in process S920, is to first take the score with the smallest difference among the matching scores obtained in the past for the face and finger within the validity period, respectively, and then to determine whether or not this score is below the predetermined authentication threshold for both the face and finger. The authentication is determined based on whether or not the score is below a predetermined authentication threshold for each of the face and finger. For example, an AND judgment can be made that authentication is successful only when both the face and finger scores are below the threshold, or an OR judgment can be made that authentication is successful when either score is below the threshold. Similarly, score level fusion can be used, in which the fusion score is obtained by taking each of the minimum scores and multiplying them by a predetermined weight and summing them, and authentication is successful when the weight is below a predetermined threshold. In general, score level fusion is a more suitable process than AND and OR judgments because it can achieve more accurate authentication. In addition, authentication may be considered successful only when the fusion scores are consecutively below the authentication threshold when they are arranged in chronological order, thereby suppressing accidental authentication acceptance errors by others.

Figure 10:
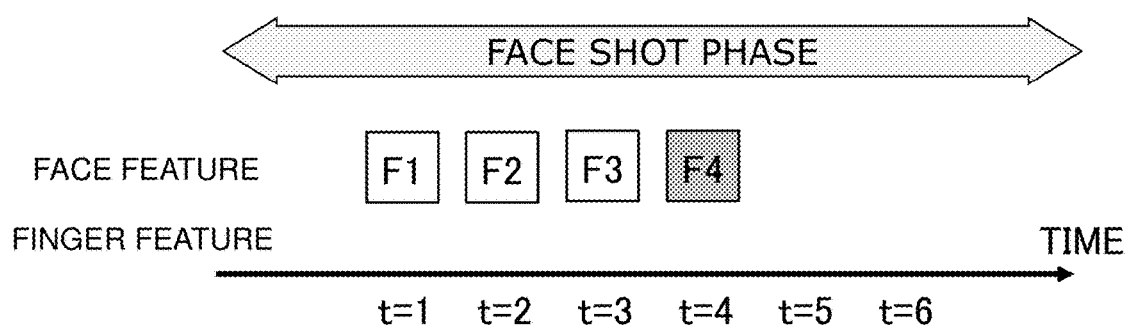
FIG. 10 shows an example of a multimodal biometric technique for Embodiment 2 that omits face or finger processing.
Figure 10:
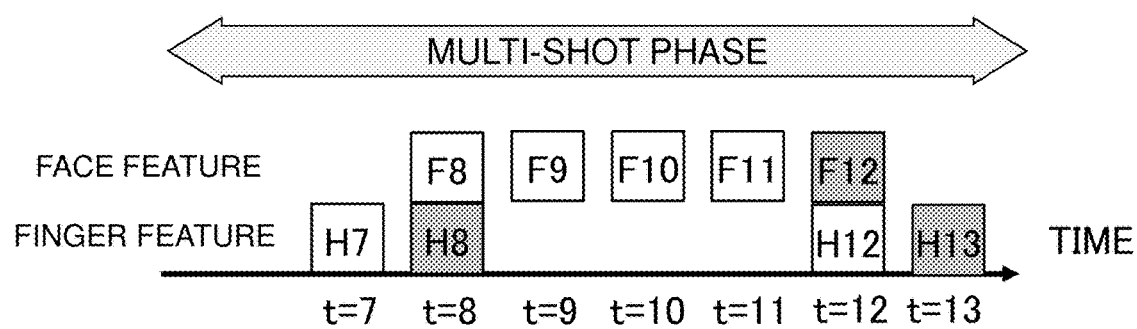

FIG. 10 illustrates an example of a multimodal biometric technique using alternating authentication with face and fingers in multimodal biometric authentication in which the face and fingers are independently matched.

If feature level fusion is not used, matching can be performed on each individual organism, so a different method can be used than in FIG. 8 above. First, from time t=1 to t=6 is the face shot phase, where only face features are extracted and matched. Here, it is assumed that the face features F1 to F3 have low similarity to the registered data, and that the similarity increases at F4 (successful face matching), and the expiration time mentioned above is set to 3. Therefore, the result is retained until time t=7. Therefore, the extraction and matching of face features from F5 to F7 can be simplified. However, since the face shot phase is limited to faces only, the original computational complexity is small, so processing F5 and F6 may be performed. In this case, for example, if the similarity is high even in F6, the processing of face features up to F9 in the later multi-shot phase can be omitted, thus further reducing the amount of computation in the later stages.

Then, from time t=7, the multi-shot phase is entered, and processing is performed on the face and fingers, respectively. However, as mentioned above, since the success of face matching is still valid up to t=7, the extraction and matching of face feature F7 can be omitted. Therefore, only the finger feature value H7 is extracted and matched here. Here, it is assumed that the finger feature value H7 has low similarity to the registered data, and processing of the finger feature value H8 is continued. At the same time, since the successful matching of the face feature expires here, the face feature F8 is processed at the same time. Here, it is assumed that the finger feature H8 has a high similarity to the registered data, while the face feature F8 has a low similarity. Since the finger feature values are already similar to the registered data, processing is omitted for the three periods from time t=9 to t=11. On the other hand, since the face features F8 have low similarity, the extraction and matching of face features F9 through F11 are performed again. In this case, the processing speed is improved because the focus can be on processing only face features during this period. Let us assume that none of the data from F8 to F11 is similar to the registered data. At time t=12, the result that the finger feature H8 was highly similar to the registered data expires, and the finger feature H12 is extracted again for matching. Then, F12 is extracted for the face. If only the face feature F12 is highly similar to the registered data, at time t=13, the extraction of the face feature is simplified and only the finger feature H13 is extracted and matched. If it is confirmed that H13 is similar to the registered data, then the face feature F12 is similar to the registered data and the finger feature H13 is similar at time t=12. Therefore, the authentication can be judged as a success at t=13.

Thus, when matching can be performed separately for each biometric feature, the process can be simplified more effectively than when feature-level fusion is performed, and thus the processing speed can be improved to a greater extent. The advantage of setting the above-mentioned expiration time is that even if another person is accidentally authenticated successfully, this will not continue indefinitely, which has the effect of preventing the erroneous acceptance of another person.

The invention is not limited to the above examples but includes various variations. For example, the above examples are described in detail for a better understanding of the invention and are not necessarily limited to those having all the configurations described. It is possible to replace some of the configurations of one example with configurations of other examples, and it is also possible to add configurations of other examples to the configurations of one example. It is also possible to add, delete, or replace some of the configurations of each example with other configurations.

REFERENCE SIGNS LIST

1: Finger
2: Input device
3: Light source
4: Face
9: Camera
10: Authentication processing device
11: Central Processing Unit
12: Memory
13: Interface
14: Storage device
15: Display
16: Input device
17: Speaker
18: Image input unit
20: Registration-processing unit
21: Authentication processing unit
22: Bio-detection unit
23: Photography control unit
24: Quality judgment unit
25: Feature extraction unit
26: Collation unit
27: Authentication judgment unit
41: Notebook PC
42: Display
43: Face guide
44: Finger guide
45: Left hand
46: Guide message
47: Preview image
141: Buffer of face features for Face Shot Phase
142: Buffer of face features in Multi-shot phase
1000: Biometric authentication system

The invention claimed is:

1. An authentication system, comprising:
a capture device which captures images of a biological object;
a memory device connected to the capture device that stores a plurality of biometric feature quantities corresponding to each user; and
an authentication processing device that receives images captured by the capture device and performs biometric authentication using the received images,
wherein the capture, device is configured to:
in a first period of time, capture a first biometric of a first user, and
in a second period of time, different from the first period of time, capture a second biometric and a third biometric of the first user, and
wherein the authentication processing, device is configured to:
calculate a first feature quantity from the first biometric captured during the first period of time,
calculate a second feature value and a third feature value from the second biometric and the third biometric captured during the second period, respectively, and
select the third feature quantity during the second period if a quality score of the third feature quantity exceeds a predetermined value,
alternately select the first feature amount calculated in the first period and the second feature amount calculated in the second period among feature amounts in which a quality score for the first feature amount calculated in the first period and the second feature amount calculated in the second period exceeds a predetermined value, to generate a feature pair with the selected third feature quantity, and
perform matching using the feature pair based on the first or second biometric feature quantity and the third biometric feature quantity stored in the memory device for each user.

2. The authentication system according to claim 1,
wherein the storage device stores a plurality of user identification information in correspondence with feature quantities of the first and second biometrics for each user,
wherein the first and the second biometrics that are captured by the capture device in the first and second periods, respectively, are the same area of the same user,
wherein a second feature quantity is a feature quantity of a different region of the same user from the first biometric, and
wherein the storage device stores a plurality of the first and second feature quantities.

3. The authentication system according to claim 2,
wherein the authentication processing device, device is configured to:
calculate quality scores for the first and second feature quantities, and
stores the first and second quantities and corresponding quality scores in the storage device upon determining the quality scores exceed predetermined values.

4. The authentication system according to claim 1,
wherein the authentication processing device uses a fusion feature that is a combination of the first, second and third feature quantities.

5. The authentication system according to claim 3,
wherein the authentication processing device is configured to:
store in the storage device, in chronological order, the features in which quality scores exceed the predetermined value for the first feature quantity calculated during the first period and the second feature quantity calculated during the second period, and
when generating the feature pairs, alternately selects the first feature quantity calculated during the first period and the second feature quantity calculated during the second period in order of priority from oldest to youngest.

6. The authentication system according to claim 3,
wherein the storage device stores the first and second feature quantities in descending order of quality score, and
wherein the authentication processing device selects the feature quantities in order of increasing quality value and generates a feature pair with the third feature quantity.

7. The authentication system according to claim 3,
wherein the authentication processing device alternately extracts of the second feature quantity and the third quantity in the second period.

8. The authentication system according to claim 1,
wherein the authentication processing device independently compares the first feature quantity, the second feature quantity, and the third feature quantity, and if the result of matching is highly similar to a feature quantity pre-registered in the storage device, and omits the matching of the feature quantity for a certain period of time.

9. A biometric authentication method for an authentication system including a capture device which captures images of a biological object, a memory device connected to the capture device that stores a plurality of biometric feature quantities corresponding to each user, and an authentication processing device that receives images captured by the capture device and performs biometric authentication using the received images, the biometric authentication method comprising:
capturing a first biometric of the first user in a first period of time by the capture device;
capturing a second biometric and a third biometric of the first user in a second period of time different from the first period of time by the capture device;
calculating, by the authentication processing device, a first feature quantity from the first biometric captured during the first period of time;
calculating, by the authentication processing device, the second and third feature quantities from the second biometric and the third biometric captured during the second period of time, respectively;
selecting the third feature quantity during the second period if a quality score of the third feature quantity exceeds a predetermined value;
alternately selecting the first feature amount calculated in the first period and the second feature amount calculated in the second period among feature amounts in which a quality score for the first feature amount calculated in the first period and the second feature amount calculated in the second period exceeds a predetermined value, to generate a feature pair with the selected third feature quantity; and
matching using the feature pair based on the first or second biometric feature quantity and the third biometric feature quantity stored in the memory device for each user.

10. The biometric authentication method according to claim 9, wherein the authentication processing device executes steps comprising:
generating a feature pair with the third feature quantity calculated during the second period and either the first or second feature quantity, and
performing the matching using the feature pair based on stored feature quantities of the first and second biometrics for each user.

* * * * *